United States Patent
Hwang et al.

(10) Patent No.: US 10,271,041 B2
(45) Date of Patent: Apr. 23, 2019

(54) METHOD OF ESTIMATING PARAMETER OF THREE-DIMENSIONAL (3D) DISPLAY DEVICE AND 3D DISPLAY DEVICE USING THE METHOD

(71) Applicant: Samsung Electronics Co., Ltd., Suwon-si, Gyeonggi-do (KR)

(72) Inventors: Hyoseok Hwang, Seoul (KR); Dong Kyung Nam, Yongin-si (KR); Hyun Sung Chang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 255 days.

(21) Appl. No.: 15/138,627

(22) Filed: Apr. 26, 2016

(65) Prior Publication Data

US 2017/0041592 A1    Feb. 9, 2017

(30) Foreign Application Priority Data

Aug. 7, 2015    (KR) .................. 10-2015-0111744

(51) Int. Cl.
| | |
|---|---|
| H04N 5/225 | (2006.01) |
| H04N 13/302 | (2018.01) |
| H04N 13/398 | (2018.01) |
| G06T 7/80 | (2017.01) |
| G06T 7/73 | (2017.01) |
| G06F 3/01 | (2006.01) |
| H04N 13/327 | (2018.01) |

(52) U.S. Cl.
CPC .......... *H04N 13/302* (2018.05); *G06F 3/013* (2013.01); *G06T 7/74* (2017.01); *G06T 7/80* (2017.01); *H04N 5/225* (2013.01); *H04N 13/327* (2018.05); *H04N 13/398* (2018.05); *H04N 2213/006* (2013.01)

(58) Field of Classification Search
CPC ............... H04N 13/0402; H04N 5/225; H04N 13/0425; G06T 7/80; G06T 7/74
USPC .......................................................... 348/51
See application file for complete search history.

(56) References Cited

U.S. PATENT DOCUMENTS

| | | | |
|---|---|---|---|
| 8,743,214 B2 | 6/2014 | Grossmann et al. | |
| 8,994,714 B2 | 3/2015 | Erinjippurath et al. | |
| 9,019,354 B2 | 4/2015 | Grossmann | |
| 2013/0182083 A1 | 7/2013 | Grossmann | |
| 2016/0156896 A1 | 6/2016 | Heo et al. | |

FOREIGN PATENT DOCUMENTS

| | | |
|---|---|---|
| JP | 2013-214206 A | 10/2013 |
| JP | 5711104 B2 | 4/2015 |
| KR | 2012-0015269 A | 2/2012 |

OTHER PUBLICATIONS

Hyoseok Hwang et al : "P-73 : Lenticular Lens parameter Estimation using single image for crosstalk reduction of three-dimensional multi-view display", SID International Symposium, Digest of Technical Papers, vol. 46, No. 1, Jun. 1, 2015, pp. 1417-1420.

(Continued)

*Primary Examiner* — Nguyen T Truong
(74) *Attorney, Agent, or Firm* — Harness, DIckey & Pierce, P.L.C.

(57) ABSTRACT

A method of estimating a parameter of a three-dimensional (3D) display device includes estimating a transformation parameter between a camera and a display based on an image displayed on the display and an image reflected by a reflector.

44 Claims, 26 Drawing Sheets

(56) References Cited

OTHER PUBLICATIONS

Hyoseok Hwang et al : "3D display calibration by visual pattern analysis", arxiv.org, Cornell University Library, Jun. 23, 2016, XP080710326, pp. 1-12.
Extended European Search Report dated Mar. 23, 2017 issued in corresponding European Application No. 16183097.1.
Hesch et al. "Determining the Camera to Robot-body Transformation from Planar Mirror Reflections", IEEE/RSJ International Conference on Intelligent Robots and Systems, France, 2008.
Zhang. "A Flexible New Technique for Camera Calibration," Technical Report, MSR-TR-98-71. *IEEE Transactions on Pattern Analysis and Machine Intelligence*, 22(11), 2000.

| n | θ (deg) | P (mm) |
|---|---------|--------|
| 1 | 23.2735 | 1.08 |
| 2 | 11.9920 | 0.5566 |
| 3 | 8.0214 | 0.3723 |
| 4 | 6.0218 | 0.2795 |

METHOD OF ESTIMATING PARAMETER OF THREE-DIMENSIONAL (3D) DISPLAY DEVICE AND 3D DISPLAY DEVICE USING THE METHOD

CROSS-REFERENCE TO RELATED APPLICATION

This application claims under 35 U.S.C. § 119 to Korean Patent Application No. 10-2015-0111744, filed on Aug. 7, 2015, in the Korean Intellectual Property Office, the entire contents of which are incorporated herein by reference in its entirety.

BACKGROUND

1. Field

At least one example embodiment relates to a method of estimating a parameter of a three-dimensional (3D) display device and/or a 3D display device using the method.

2. Description of the Related Art

Among factors related to three-dimensional (3D) image recognition, the foremost factor is a disparity between images viewed by both eyes of a user. Methods of providing different images to both eyes of a user may be classified into a stereoscopic type and an autostereoscopic type. The stereoscopic type method may filter a desired image through division methods that involve using a polarized light, time division, and wavelength division for differentiating a wavelength of a primary color. The autostereoscopic type method may enable images to be viewed only in a desired (or alternatively, predetermined) space using a 3D transform device, for example, a parallax barrier, a lenticular lens, or a directional backlight unit.

The autostereoscopic type method may alleviate an inconvenience of wearing glasses. In the autostereoscopic method, to restrain crosstalk of a 3D image, the 3D image is to be accurately projected to both eyes of a user. When an error occurs in a process of detecting positions of both eyes of a user, or when an error differing from a designed value occurs in a process of producing or installing a 3D display device and a 3D transform device, the quality of the image may deteriorate.

SUMMARY

At least one example embodiment relates to a method of estimating a parameter of a display device.

In at least one example embodiment, the method may include displaying, on a display, a first image including a first pattern, capturing second images generated when the first image is reflected by a reflector at different angles, using a camera combined with the display, and estimating a first transformation parameter between the camera and the display based on the first image and the second images.

The first transformation parameter may include at least one of a rotation matrix that performs transformation between coordinates of the camera and coordinates of the display, and a translation vector that performs transformation between coordinates of the camera and coordinates of the display.

The estimating may include determining the first transformation parameter that minimizes projection errors between the first pattern and virtual patterns corresponding to the second images.

The estimating may include estimating geometric relationships between the display and the reflector based on the second images, calculating projection errors between the first pattern and virtual patterns corresponding to the second images based on the geometric relationships, and updating the first transformation parameter to reduce the projection errors.

The method may further include at least one of estimating an intrinsic parameter of the camera based on the first pattern and at least one of the second images, and estimating a second transformation parameter between the display and an optical layer combined with the display based on a second pattern included in the first image and at least one of the second images.

The estimating of the second transformation parameter may include estimating the second transformation parameter based on a period of the second pattern, a period of a third pattern included in the at least one second image, and a gradient of the third pattern.

The method may further include at least one of obtaining the period of the second pattern based on a subpixel structure of the display, and obtaining the period of the third pattern and the gradient of the third pattern in a Fourier space in which the third pattern is frequency-transformed.

The intrinsic parameter may include at least one of a focal length of the camera, a center position of the camera, and a skewness of the camera.

The second transformation parameter may include at least one of a pitch of the optical layer and a rotation angle between the optical layer and the display.

The second pattern may include at least one of a pattern in which continuous lines of an identical brightness are arranged at intervals, and a pattern including areas with an identical color and an identical brightness.

The first pattern may include a pattern in which a shape is repeated. Each of the virtual patterns is a virtual image generated when the first pattern is focused at a corresponding angle in the reflector. The second pattern may be included in a shape repeated in the first pattern.

At least one example embodiment relates to a three-dimensional (3D) display device.

In at least one example embodiment, the 3D display device may include a camera configured to perform eye tracking, a display configured to display a 3D image, and a processor configured to control the display to display a first image including a first pattern, control the camera to capture second images generated when the first image is reflected by a reflector at different angles, estimate a first transformation parameter between the camera and the display based on the first image and the second images, track eyes of the user based on the first transformation parameter, and render the 3D image based on the tracked eyes.

At least one example embodiment relates to a method of estimating a parameter of a display device.

In at least one example embodiment, the method may include displaying, on a display, a first image including a first pattern and a second pattern, capturing a second image generated when the first image is reflected in a reflector, using a camera combined with the display, estimating a parameter of the camera based on an area corresponding to the first pattern in the second image, estimating a first transformation parameter between the camera and the display based on the area corresponding to the first pattern in the second image, and estimating a second transformation parameter between the display and an optical layer combined with the display based on an area corresponding to the second pattern in the second image.

At least one example embodiment relates to a display device.

In at least one example embodiment, the display device may include a display configured to display a first image including a first pattern and a second pattern, a camera combined with the display to capture a second image generated when the first image is reflected in a reflector, and a processor configured to estimate a parameter of the camera based on an area corresponding to the first pattern in the second image, estimate a first transformation parameter between the camera and the display based on the area corresponding to the first pattern in the second image, and estimate a second transformation parameter between the display and an optical layer combined with the display based on an area corresponding to the second pattern in the second image.

At least one example embodiment relates to a device including a processor and a memory including computer readable instructions, which when executed by the processor, cause the processor to receive a first image displayed by a display, the first image including a first pattern. The computer readable instructions cause the processor to receive second images, the second images being reflected versions of the first image that are captured at different angles. The computer readable instructions cause the processor to estimate a first transformation parameter between the camera and the display based on the first image and the second images.

The first transformation parameter includes at least one of a rotation matrix and a translation vector, and the memory includes computer readable instructions to cause the processor to transform a coordinate system of the camera into a coordinate system of the display based on at least one of the rotation matrix and the translation vector, and render a three-dimensional image using the transformed coordinate system.

The processor is configured to estimate by determining the first transformation parameter as a transformation parameter that minimizes projection errors between the first pattern and virtual patterns corresponding to the second images.

Each of the virtual patterns is a virtual image generated when the first pattern is focused at a corresponding one of the different angles.

The processor is configured to estimate by estimating geometric relationships between the display and a reflector based on the second images, the reflector being used to generate the second images, calculating projection errors between the first pattern and virtual patterns corresponding to the second images based on the geometric relationships, and updating the first transformation parameter to reduce the projection errors.

The first image includes a second pattern, and the memory includes computer readable instructions to cause the processor to estimate an intrinsic parameter of the camera based on the first pattern and at least one of the second images, and estimate a second transformation parameter between the display and an optical layer associated with the display based on the second pattern and the at least one of the second images.

The at least one of the second images includes a third pattern, and the processor is configured to estimate the second transformation parameter based on a period of the second pattern, a period of the third pattern, and a gradient of the third pattern.

The second transformation parameter includes at least one of a pitch of the optical layer and a rotation angle between the optical layer and the display, and the memory includes computer readable instructions to cause the processor to render a three-dimensional image based on at least one of the pitch and the rotation angle.

At least one example embodiment relates to a method including receiving a first image displayed by a display, the first image including a first pattern. The method includes receiving second images, the second images being reflected versions of the first image that are captured at different angles. The method includes estimating a first transformation parameter between the camera and the display based on the first image and the second images, and rendering a three-dimensional image based on the first transformation parameter.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
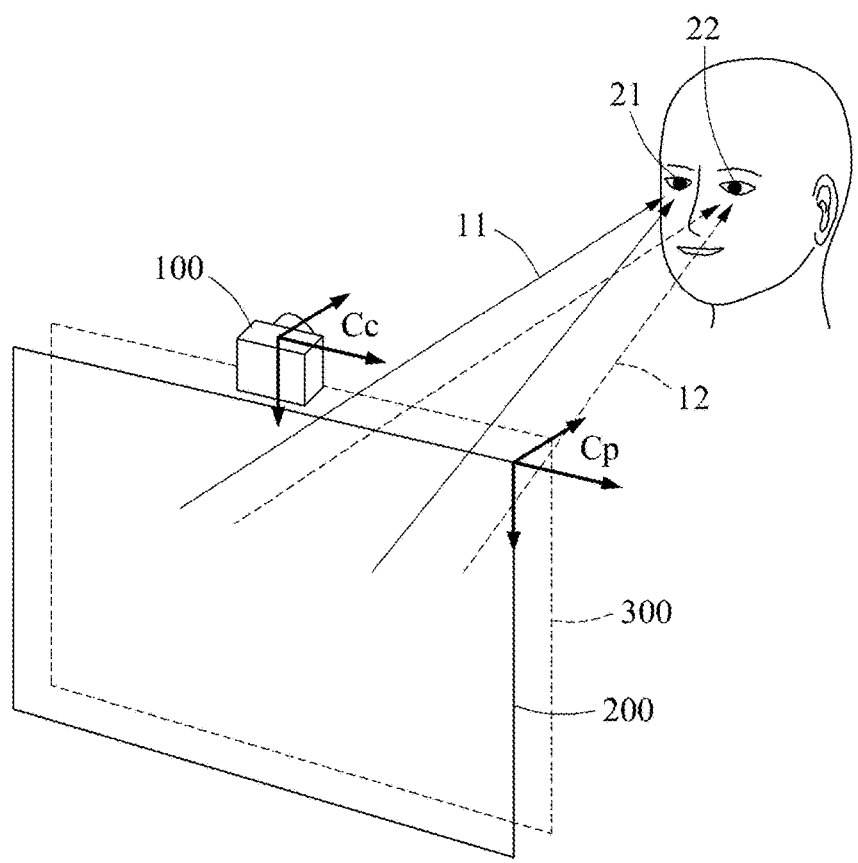
FIG. 1 illustrates a relationship among parameters according to at least one example embodiment.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Expressions such as "at least one of," when preceding a list of elements, modify the entire list of elements and do not modify the individual elements of the list.

The following example embodiments may be applied to a display device equipped with a camera, a three-dimensional (3D) display device, and a 3D display device equipped with a camera. For example, the example embodiments may be used to increase a quality of image in an autostereoscopic 3D display device.

FIG. 1 illustrates a relationship among parameters according to at least one example embodiment.

Referring to FIG. 1, a 3D display system includes a camera 100, a display 200, and a 3D transform device 300. The camera 100 detects a right eye 21 and a left eye 22 of a user. The 3D transform device 300 may include an optical layer such as a lens array, a parallax barrier, or a directional backlight unit, for example. The 3D transform device 300 divides an image output on the display 200 in to a ray 11 corresponding to the right eye 21 and a ray 12 corresponding to the left eye 22. The ray 11 and the ray 12 are projected to the right eye 21 and the left eye 22, respectively. The user may view a 3D image through the ray 11 and the ray 12 without wearing glasses.

To increase a quality of the 3D image, positions of the right eye 21 and the left eye 22 are to be detected accurately, and the ray 11 and the ray 12 are to be projected accurately to the right eye 21 and the left eye 22. The quality of the image may be affected by factors such as an error in a process of transforming a two-dimensional (2D) image to a 3D image, and an error differing from a designed value occurring in a process of producing and installing the respective devices. Such factors may cause crosstalk. When crosstalk occurs, the user may view a blurred image, or view a distorted image that may cause vertigo if the distortion is extreme.

The factors may be adjusted by a camera parameter Pc, a pose parameter Tcp between the camera 100 and the display 200, and a parameter Pb of the 3D transform device. By adjusting such parameters (e.g., for subsequent image rendering), the quality of the 3D image may increase.

The camera 100 may represent an object in a 3D space as a 2D image. Thus, an error may occur in the process of transforming a 3D space into a 2D image. For example, the error may be caused by an image sensor or a lens in an internal portion of the camera 100. A correspondence between a 3D space and a 2D image may be estimated through the parameter Pc. The camera parameter Pc includes an intrinsic parameter and an extrinsic parameter. A world coordinate system indicating a 3D real space and a camera coordinate system Cc may be transformed (or related) to each other through the camera parameter Pc. Thus, an error by the camera 100 may be compensated for by the camera parameter Pc during image rendering.

The camera 100 and the display 200 use different coordinate axes. The positions of the eyes 21 and 22 of the user estimated through the camera parameter Pc are based on the camera coordinate system Cc. Thus, the camera coordinate system Cc is to be transformed to a display coordinate system Cp. The pose parameter Tcp between the camera 100 and the display 200 indicates a transformation relationship between the camera coordinate system Cc and the display coordinate system Cp, for example, rotation, and translation. The camera coordinate system Cc may be transformed into the display coordinate system Cp through the pose parameter Tcp. Hereinafter, for ease of description, the pose parameter Tcp will be referred to as a first transformation parameter. The 3D display system detects the eyes 21 and 22 of the user through the camera 100, transforms camera coordinates of the eyes 21 and 22 of the user into display coordinates based on the first transformation parameter, and tracks a viewpoint of the user using the display coordinates.

The rays 11 and 12 output from the display 200 are transferred to the user through the 3D transform device 300 (or optical layer). Thus, crosstalk may occur due to design errors in the 3D transform device 300. When an error occurs between actual directions of the rays 11 and 12 and designed directions, crosstalk may occur. For example, such an error may include a size error and a pose (or position) error. The size error may refer to a dimension of an optical layer differing from a designed value, and the pose error may refer to a pose (or position) of the optical layer differing from a designed value. The size error and the pose error may be compensated for through the parameter Pb of the 3D transform device 300.

The parameter Pb includes a size and a pose of the 3D transform device 300. As a representative example of the size, a pitch of the optical layer may be used. The pitch of the optical layer may be a distance between optical elements. Further, as a representative example of the pose, a rotation angle between the optical layer and a panel may be used. A lens or a barrier included in the optical layer may be slanted. The rotation angle may be an angle at which the lens or the barrier included in the optical layer is slanted. Hereinafter, for ease of description, the parameter Pb of the 3D transform device 300 will be referred to as a second transformation parameter.

In an example, the rotation angle may change based on a slanted angle determined when the optical layer is manufactured, a height at which the optical layer is attached to the panel, and an angle at which the optical layer is attached to the panel. The pose error may be compensated for by the parameter Pb of the 3D transform device 300 and the pose coefficient cb between the display 200 and the 3D transform device 300. In one example, the second transformation parameter may include the parameter Pb of the 3D transform device 300, and the pose coefficient cb between the display 200 and the 3D transform device 300. A three-dimensional image may be rendered using the parameter Pb.

According to at least one example embodiment, by photographing a single image or a single set of images, all of the intrinsic parameter of the camera 100, the first transformation parameter, and the second transformation parameter may be obtained.

Figure 2A:
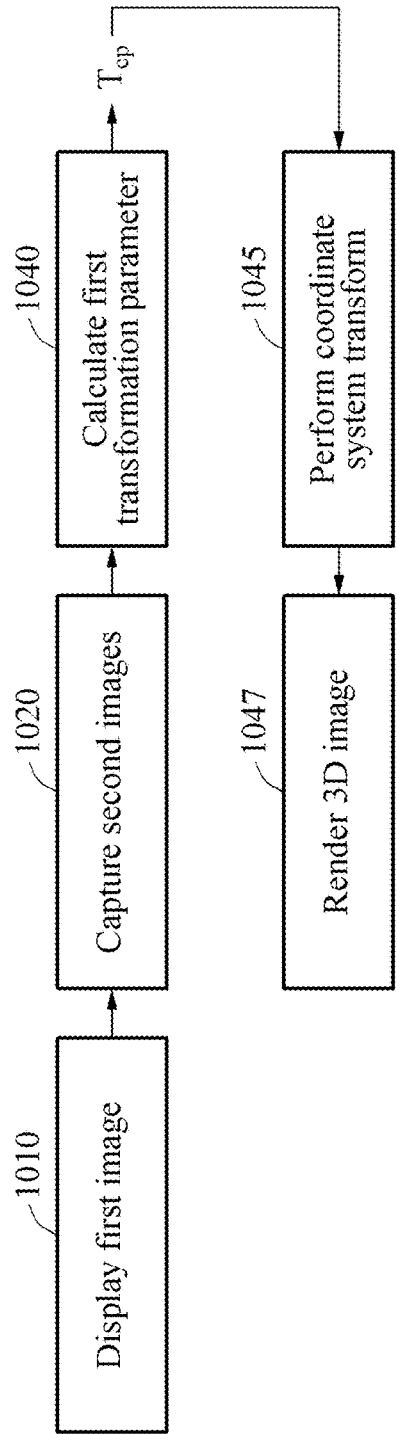
FIGS. 2A and 2B illustrate a process of estimating parameters according to at least one example embodiment.
Figure 2B:
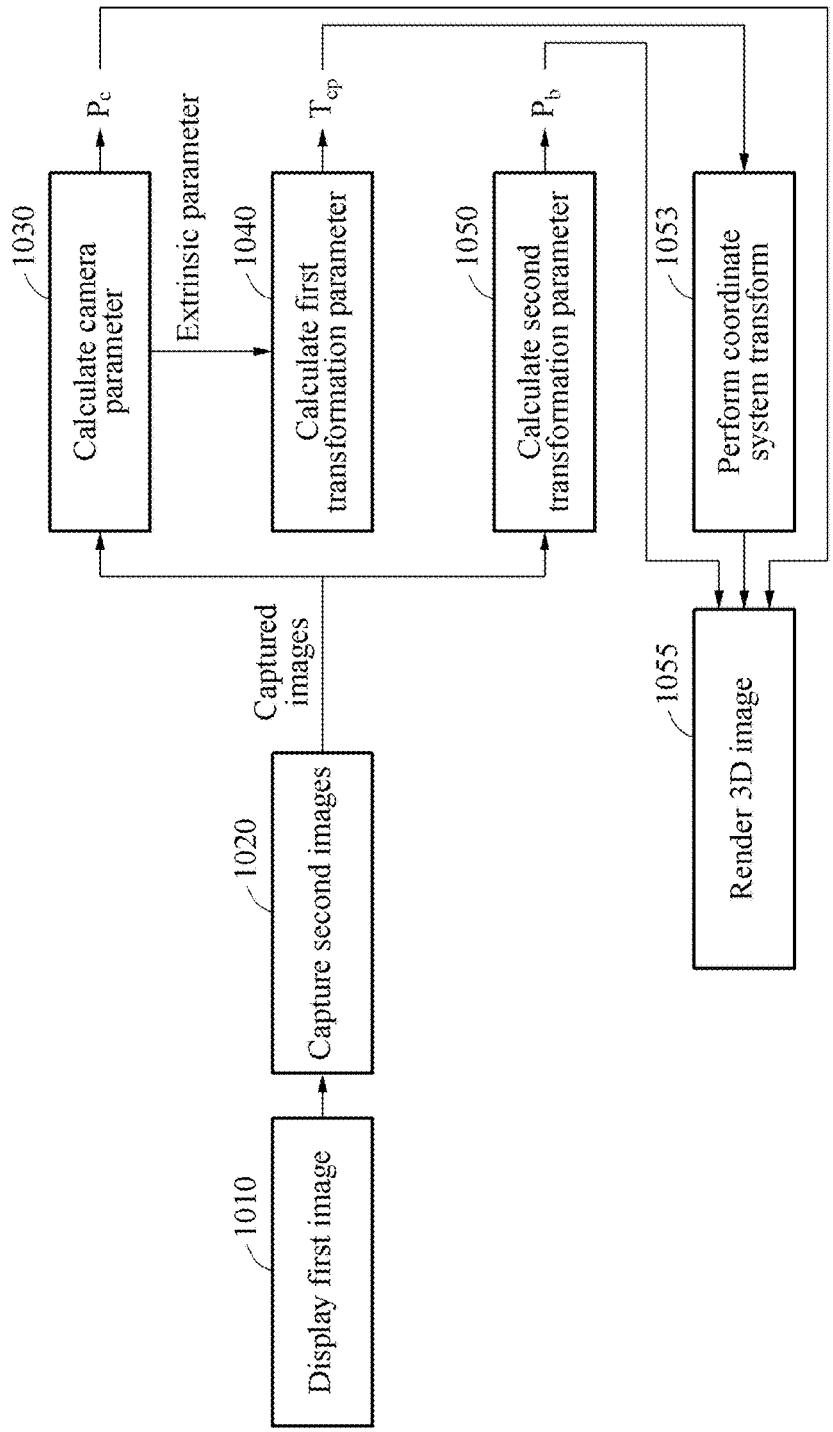

FIGS. 2A and 2B illustrate a process of estimating parameters according to at least one example embodiment. As shown in FIG. 2A, a method according to at least one example embodiment may include operations 1010, 1020, 1040, 1045, and/or 1047. As shown in FIG. 2B, a method according to at least one example embodiment may include operations 1010, 1020, 1030, 1040, 1050, 1053 and/or 1055. The operations in FIGS. 2A and 2B may be carried out and/or caused by processor 2810 from FIG. 22.

Referring to FIG. 2A, in operation 1010, a first image is displayed on a display. The first image may include a first pattern. In operation 1020, second images generated when the first image is reflected by a reflector at different angles are captured. The second images may be captured using a camera combined with a display. The camera may capture an image generated when an image displayed on the display is reflected in the reflector. When capturing the image reflected in the reflector, setting a z coordinate value of the image displayed on the display to "0" may be reliable. Further, use of the image output on the display to estimate a pose between the camera and the display may be useful. A process of acquiring a captured image through a reflector will be described in detail with reference to FIG. 3. In operation 1040, a first transformation parameter is calculated based on an extrinsic parameter of the camera. A process of calculating a first transformation parameter will be described with reference to FIG. 7. In operation 1045, the camera coordinate system Cc may be transformed into the display coordinate system Cp through the first transformation parameter Tcp. In operation 1047, a three-dimensional (3D) image may be rendered based on the transformed coordinate system. For example, the transformed coordinate system may be applied to tracking eyes of a user when rendering a 3D image by the 3D system of FIG. 1 so that a quality of the 3D image is enhanced.

Figure 3:
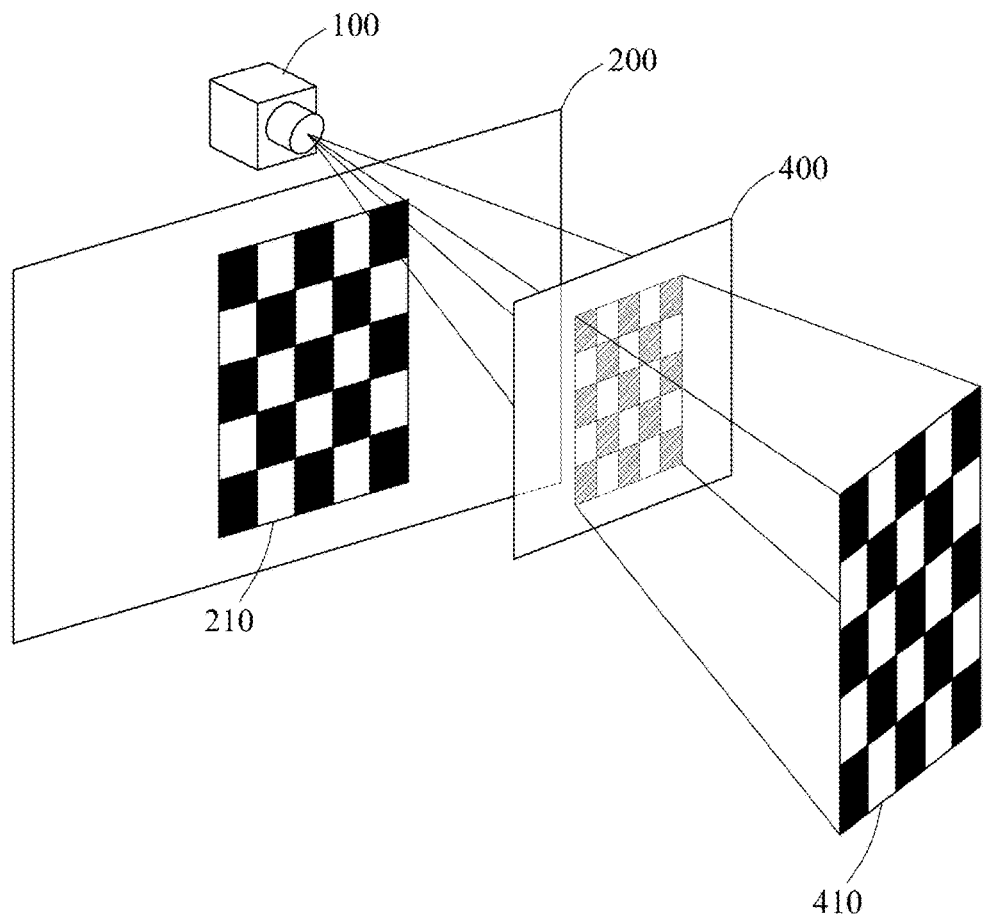
FIG. 3 illustrates a method of acquiring a captured image according to at least one example embodiment.

FIG. 3 illustrates a method of acquiring a captured image according to at least one example embodiment.

Referring to FIG. 3, the camera 100 may capture a second image 410 generated when a first image 210 output on the display 200 is reflected by a reflector 400. The reflector 400 may include a mirror. When the first image 210 is reflected in the reflector 400, the first image 210 may appear to be positioned behind the reflector 400. The second image 410 focused in the reflector 400 may be a virtual image. The first image 210 and the second image 410 include desired (or alternatively, predetermined) patterns for estimating a parameter. Hereinafter, the pattern included in the second image 410 will be referred to as a virtual pattern. Types of patterns will be described in detail with reference to FIG. 4.

Figure 4:
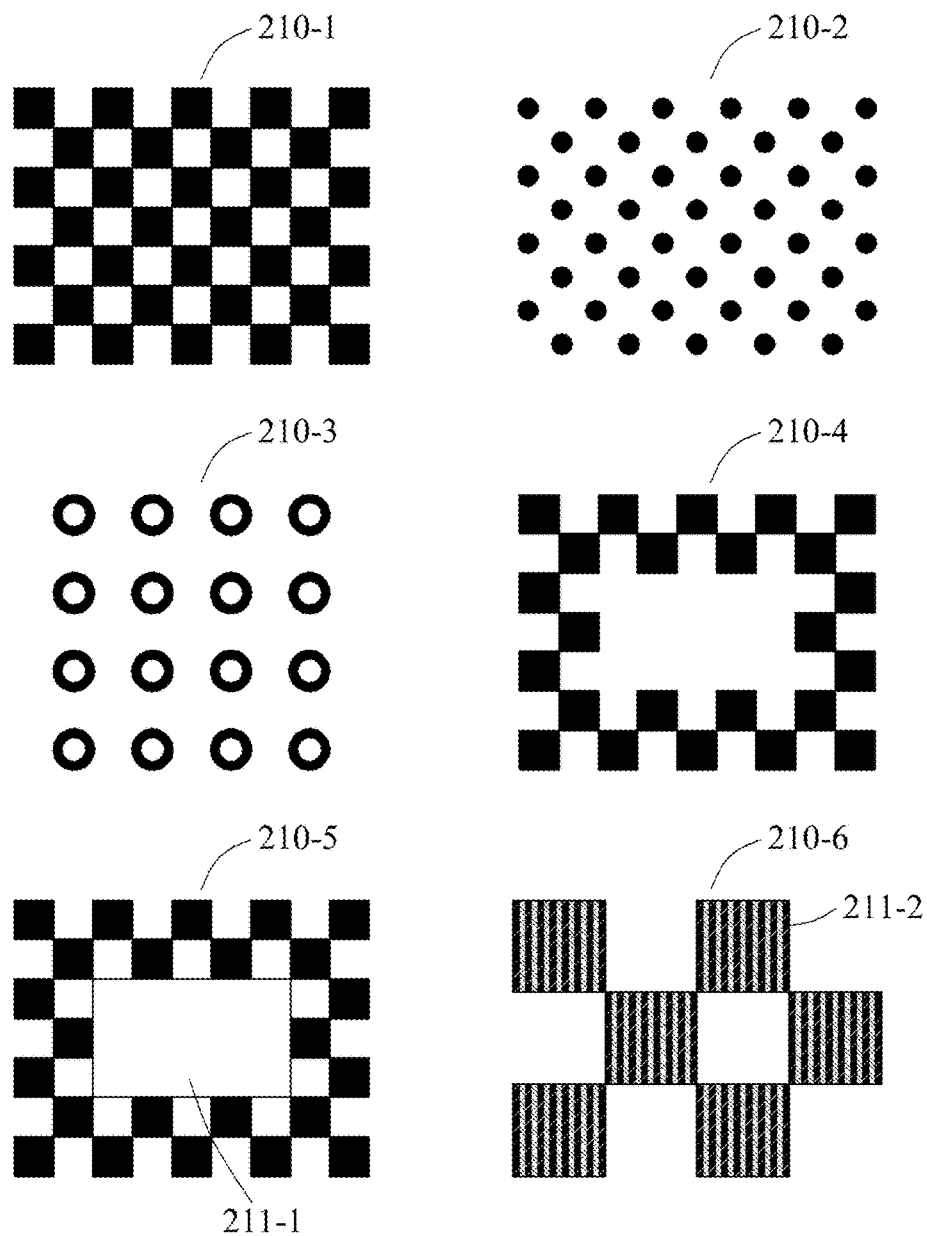
FIG. 4 illustrates types of patterns according to at least one example embodiment.

FIG. 4 illustrates types of patterns according to at least one example embodiment. As described above, a first image and a second image include desired (or alternatively, predetermined) patterns. A pattern may have a repeated shape for estimating a parameter. For example, the pattern may be a chess board pattern 210-1, a point arrangement pattern 210-2, a concentric circle pattern 210-3, and a modified pattern 210-4. Hereinafter, a pattern having a single repeated shape, similar to the patterns 210-1, 210-2, 210-3, and 210-4, or a pattern having a modified single repeated shape will be referred to as a first pattern.

The first pattern may include another pattern therein. For example, the first pattern may include a pattern 211-1 and a pattern 211-2 therein. Hereinafter, a pattern included in the first pattern will be referred to as a second pattern. The second pattern may be included in an area distinguished from the first pattern similar to the pattern 211-1, or may be included in partial areas forming the first pattern similar to the pattern 211-2. The second pattern may include a pattern including continuous areas of an identical color and an identical brightness similar to the pattern 211-1, and a pattern in which continuous lines of an identical brightness are disposed at desired (or alternatively, predetermined) intervals similar to the pattern 211-2.

The first pattern may be used to estimate the camera parameter Pc and the first transformation parameter, and the second pattern may be used to estimate the second transformation parameter. Thus, when the first pattern and the second pattern are used simultaneously, the camera parameter Pc, the first transformation parameter, and the second transformation parameter may be obtained by photographing a single image or a single set of images.

Figure 5:
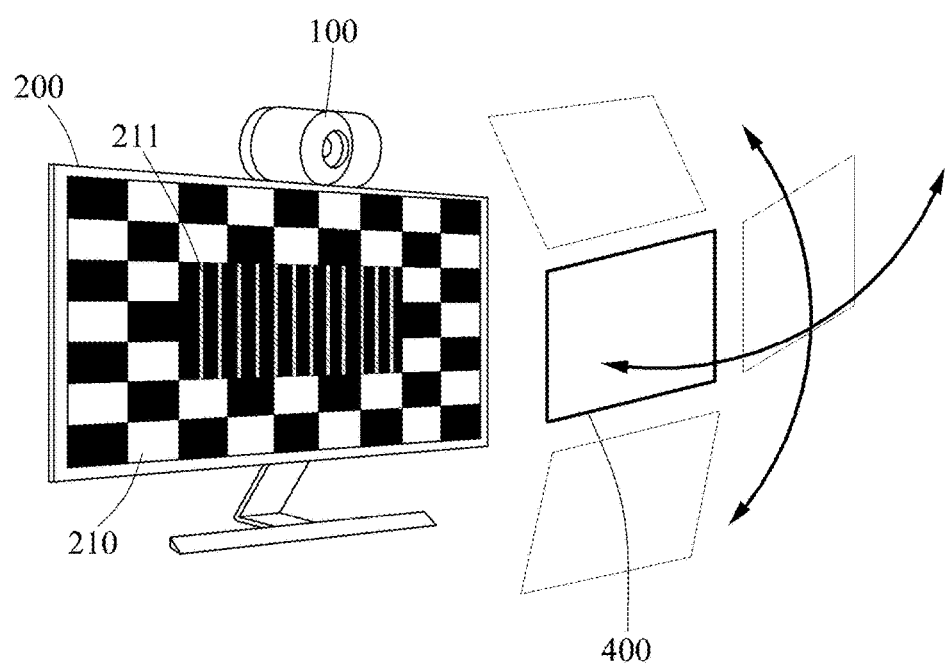
FIG. 5 illustrates a method of acquiring captured images according to at least one example embodiment.

FIG. 5 illustrates a method of acquiring captured images according to at least one example embodiment.

Referring to FIG. 5, the display outputs a first pattern 210 and a second pattern 211. The first pattern 210 and the second pattern 211 may be reflected by the reflector 400. The camera 100 may capture a virtual pattern reflected by the reflector 400. The camera 100 may acquire captured images by a movement of the reflector 400. For example, the reflector 400 may rotate and/or move, and the camera 100 may acquire images captured at various angles and positions. The reflector 400 may be manipulated through a mechanical machine and/or be manipulated manually by a user. The number of angles and positions may be a design parameter selected based on empirical evidence. Although not shown in the drawings, when the display 200 and the camera 100 are included in a mobile device, the display 200 and the camera 100 may move or rotate in front of the fixed reflector 400 to acquire the captured images.

Figure 6:
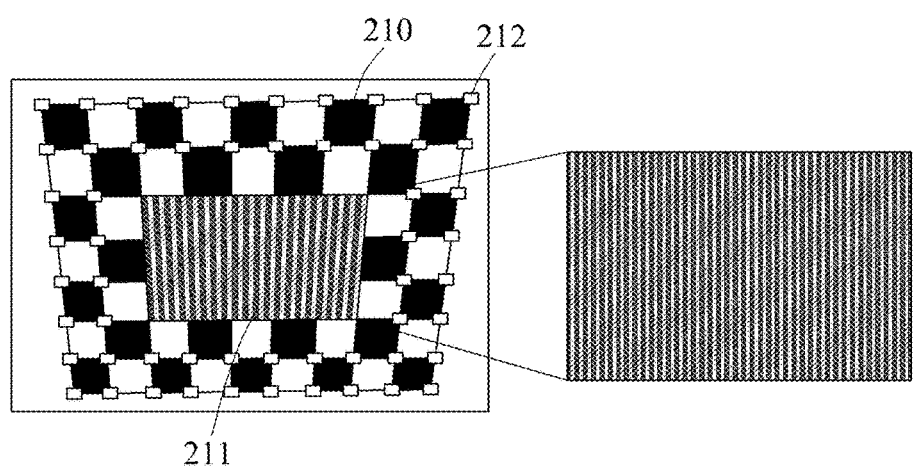
FIG. 6 illustrates feature points according to at least one example embodiment.

FIG. 6 illustrates feature points according to at least one example embodiment.

Referring to FIG. 6, the first pattern 210, the second pattern 211, and a feature point 212 of the first pattern 210 are illustrated. The first pattern 210 may include the feature point 212. The feature point 212 may be positioned at a center of a circle or at an intersecting point of a pattern. The feature point 212 may be detected using corner detection and/or circle detection. The feature point 212 may be used to estimate a parameter. When the feature point 212 is used, an amount of time used to estimate a parameter may be reduced.

Hereinafter, a process of estimating parameters will be described in detail with reference to FIG. 2B.

In operation 1030, the camera parameter Pc may be calculated based on the captured images. As described above, the camera parameter Pc includes an intrinsic parameter and an extrinsic parameter. The intrinsic parameter includes a focal length, a center position, and/or a skewness of the camera 100. The extrinsic parameter includes a rotation parameter, and/or a translation parameter. The intrinsic parameter may be expressed by Equation 1.

$$K = \begin{bmatrix} f_x & s & u_c \\ 0 & f_y & v_c \\ 0 & 0 & 1 \end{bmatrix} \quad \text{[Equation 1]}$$

In Equation 1, K denotes an intrinsic parameter, fx denotes a focal length with respect to an axis x of a camera, and fy denotes a focal length with respect to an axis y of the camera. uc and vc denote coordinates x and y at which a principle axis of the camera 100 or an axis z of camera coordinates meets an image plane. s denotes a gradient of a pixel. A relationship between a point X of a world coordinate system and a point x projected on the image plane may be expressed by Equation 2.

$$x = K[Rt]X \quad \text{[Equation 2]}$$

In Equation 2, R denotes a rotation parameter, and t denotes a translation parameter. Equation 2 may be expressed by Equation 3 and Equation 4.

$$x = f(K, R, t, X) \quad \text{[Equation 3]}$$

$$X = \begin{bmatrix} f_x & s & u_c \\ 0 & f_y & v_c \\ 0 & 0 & 1 \end{bmatrix} \begin{bmatrix} r_1 & r_2 & r_3 & r_1 \\ r_4 & r_5 & r_6 & r_2 \\ r_7 & r_8 & r_9 & r_3 \end{bmatrix} X \quad \text{[Equation 4]}$$

In Equation 3, when a pattern is captured n times, a j-th corresponding point, among m corresponding points with respect to a feature point in an i-th captured image, may be expressed by Equation 5. Here, the corresponding point refers to a point corresponding to an image captured by the camera 100 with respect to a feature point 212 of a pattern output on a display.

$$x_j = f(K, R_i, t_i, X_j) \quad \text{[Equation 5]}$$

The camera parameter Pc that reduces (or alternatively, minimizes) a projection error when all of m corresponding points of the n captured images are projected may be estimated through Equation 6.

$$\text{argmin} \sum_{i=1}^{n} \sum_{j=1}^{m} \|x_j - f(K, R_i, t_i, X_j)\|^2 \qquad \text{[Equation 6]}$$

In Equation 6, f(X) denotes a value obtained by projecting X, and may be expressed by $[u_d \ v_d \ 1]$. In Equation 6, f(X) includes a distortion. The camera parameter Pc may include a radial distortion. The accuracy of the camera parameter Pc may increase through the radial distortion. In view of the radial distortion, Equation 6 may be expressed by Equation 7.

$$\text{argmin} \sum_{i=1}^{n} \sum_{j=1}^{m} \|x_j - f'(K, k, R_i, t_i, X_j)\|^2 \qquad \text{[Equation 7]}$$

In Equation 7, k denotes a radial distortion. f'(X) of Equation 7 may be expressed by $[u_u \ v_u \ 1]$. In view of k, relational expressions among k, r, $u_u$, and $v_u$ may be expressed by Equation 8. To reduce a computational complexity, when distortion of a camera lens is relatively small, the camera parameter Pc may be obtained through Equation 6.

$$\begin{aligned} k &= \{k_1, k_2, k_3, k_4, k_5\} \\ r &= \sqrt{(u_d - u_c)^2 + (v_d - v_c)^2} \\ u_u &= \frac{u_d}{1 + k_1 r^2 + k_2 r^4 + k_3 r^6 + k_4 r^8 + k_5 r^{10}} \\ v_u &= \frac{v_d}{1 + k_1 r^2 + k_2 r^4 + k_3 r^6 + k_4 r^8 + k_5 r^{10}} \end{aligned} \qquad \text{[Equation 8]}$$

In operation 1040, a first transformation parameter may be calculated based on the extrinsic parameter of the camera. A process of calculating a first transformation parameter will be described with reference to FIG. 7.

Figure 7:
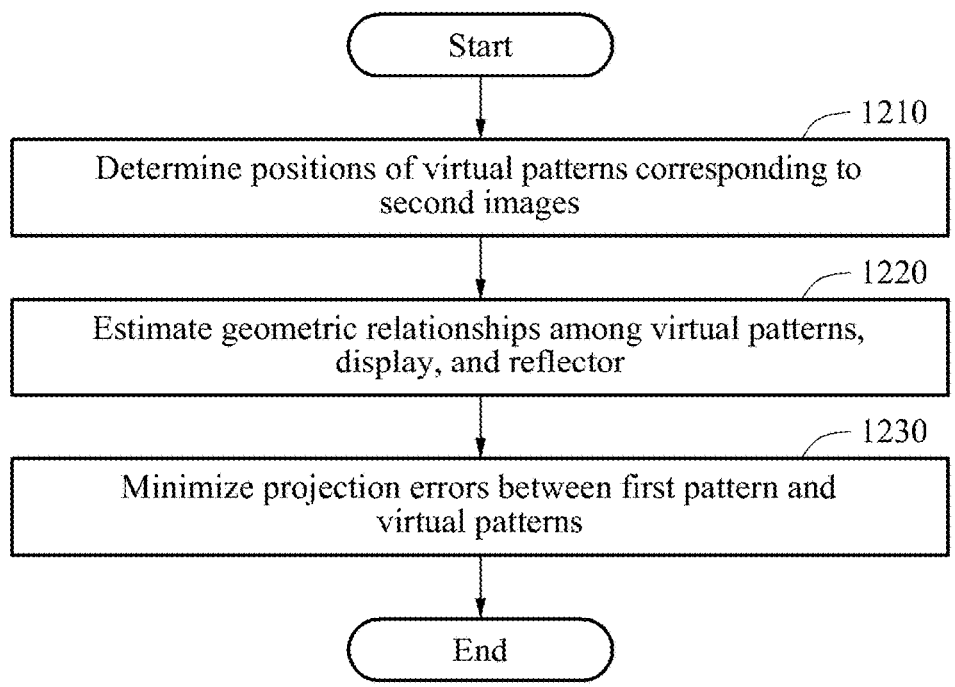
FIG. 7 illustrates a process of calculating a first transformation parameter according to at least one example embodiment.

FIG. 7 illustrates a process of calculating a first transformation parameter according to at least one example embodiment. A method according to at least one example embodiment may include one or more of operations 1210-1230. The operations in FIG. 7 may be carried out and/or caused by processor 2810 from FIG. 22.

Referring to FIG. 7, in operation 1210, positions of virtual patterns corresponding to second images are determined. The positions of the virtual patterns may be determined through Equation 9.

$$X_{ij} = \begin{bmatrix} R_i & t_i \\ 0 & 1 \end{bmatrix} \begin{bmatrix} I & t_j \\ 0 & 1 \end{bmatrix} \begin{bmatrix} 0 \\ 0 \\ 0 \\ 1 \end{bmatrix} \qquad \text{[Equation 9]}$$

In Equation 9, $x_{ij}$ denotes a position of a j-th corresponding point in an i-th image. $R_i$ and $t_i$ denote a rotation parameter and a translation parameter in the i0th image, respectively. The rotation parameter and the translation parameter may be determined from the extrinsic parameter of the camera. $t_j$ denotes coordinates of a j-th feature point. $t_j$ will be described in detail with reference to FIG. 8.

Figure 8:
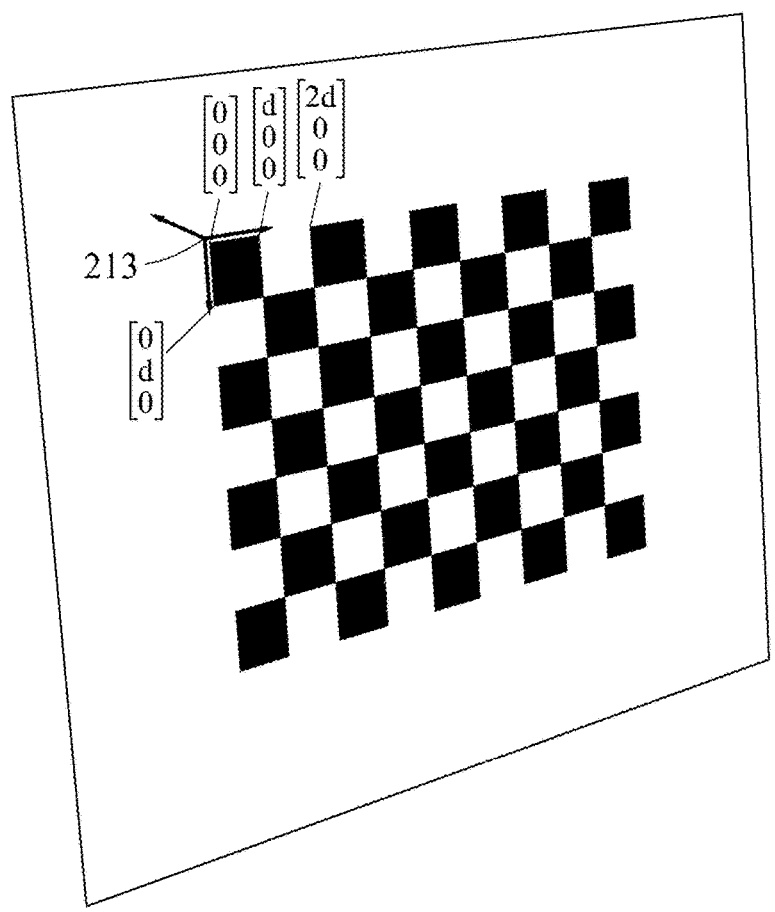
FIG. 8 illustrates coordinates of a virtual pattern according to at least one example embodiment.

FIG. 8 illustrates coordinates of a virtual pattern according to at least one example embodiment.

Referring to FIG. 8, a coordinate axis 213 of a pattern, and positions of four points with respect to the coordinate axis 213 are illustrated. In FIG. 8, d denotes a length of a single side of a rectangular included in a chess pattern. As shown in FIG. 8, tj may be a 1×3 matrix indicating coordinates of a j-th corresponding point.

Figure 9:
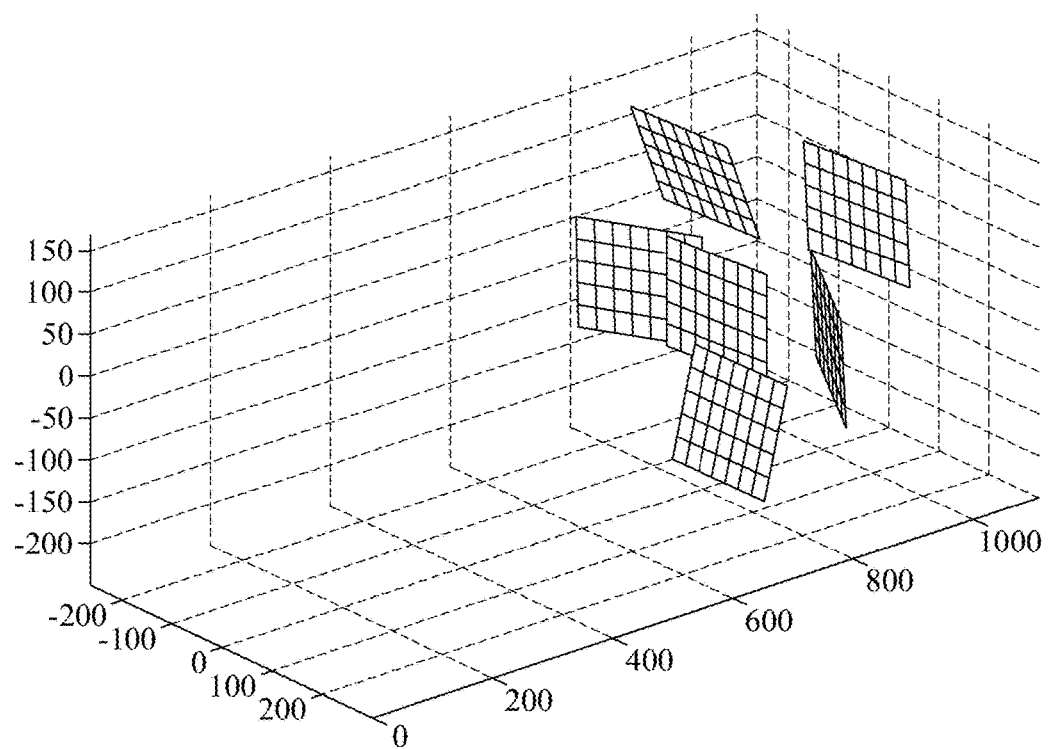
FIG. 9 illustrates restored virtual patterns according to at least one example embodiment.

Referring to FIG. 7 again, virtual patterns corresponding to n images may be restored through Equation 9. FIG. 9 illustrates restored virtual patterns according to at least one example embodiment.

In operation 1220, geometric relationships among the virtual patterns, the display, and the reflector are estimated. Operation 1220 will be described in detail with reference to FIG. 10A.

Figure 10A:
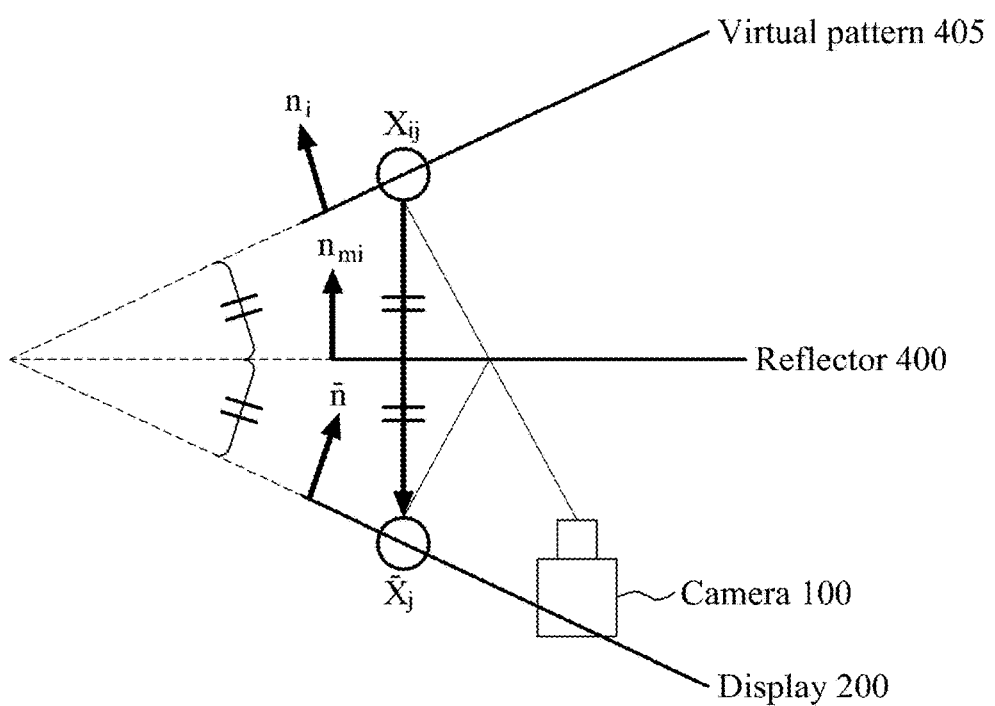
FIG. 10A illustrates geometric relationships among virtual patterns, a display, and a reflector according to at least one example embodiment.

FIG. 10A illustrates geometric relationships among virtual patterns, a display, and a reflector according to at least one example embodiment.

Referring to FIG. 10A, a geometric relationship among an estimated virtual pattern 405, the display 200, and the reflector 400 is illustrated. A position of the display 200 may be determined based on an initial value of the first transformation parameter. The initial value of the first transformation parameter may be set to be a designed value or a desired (or alternatively, predetermined) value. The first transformation parameter may be expressed by Equation 10.

$$T_{cp} \begin{bmatrix} R_{cp} & t_{cp} \\ 0 & 1 \end{bmatrix} = \begin{bmatrix} r_{cp\_11} & r_{cp\_12} & r_{cp\_13} & r_{cp\_x} \\ r_{cp\_21} & r_{cp\_22} & r_{cp\_23} & r_{cp\_y} \\ r_{cp\_31} & r_{cp\_32} & r_{cp\_33} & r_{cp\_z} \\ 0 & 0 & 0 & 1 \end{bmatrix} \qquad \text{[Equation 10]}$$

In Equation 10, $T_{cp}$ denotes a first transformation parameter, $R_{cp}$ denotes a rotation parameter of a display coordinate system Cp with respect to a camera coordinate system Cc, and tcp denotes a translation parameter of the display coordinate system Cp with respect to the camera coordinate system Cc.

When the position of the display 200 is set by setting the initial value of the first transformation parameter, a feature point of a first pattern may be projected as the virtual pattern 405. When a difference between the first transformation parameter and a true value decreases, a distance between the feature point projected based on the first transformation parameter and the corresponding point of the virtual pattern 405 decreases. Conversely, when the difference between the first transformation parameter and the true value increases, the distance between the feature point projected based on the first transformation parameter and the corresponding point of the virtual pattern 405 increases.

Hereinafter, a method of projecting the feature point of the display 200 set by the first transformation parameter as the virtual pattern 405 will be described. A j-th feature point of the display 200 may be expressed by Equation 11.

$$\overline{X}_j = \begin{bmatrix} R_{cp} & t_{cp} \\ 0 & 1 \end{bmatrix} \begin{bmatrix} I & t_j \\ 0 & 1 \end{bmatrix} \begin{bmatrix} 0 \\ 0 \\ 0 \\ 1 \end{bmatrix} \qquad \text{[Equation 11]}$$

In Equation 11, $\overline{X}_j$ denotes a j-th feature point of the display 200, and tj denotes a translated position of the j-th feature point with respect to the origin of the display 200.

The remaining parameters are the same as expressed by Equation 10. Since all feature points are present on the same plane, the feature points have identical normal vectors. A normal vector $\bar{n}$ of the display 200 corresponds to a third row of Rcp, and may be expressed by Equation 12.

$$\bar{n} = R_{cp} \begin{bmatrix} 0 \\ 0 \\ 1 \end{bmatrix} \quad \text{[Equation 12]}$$

A pose between the virtual pattern 405 and the camera 100 are known through the extrinsic parameter of the camera 100. Thus, positions of the camera 100 and the virtual pattern 405 may be specified. The position of the display 200 may be set based on the initial value of the first transformation parameter, and the position of the reflector 400 may be set at a midpoint between the display 200 and the virtual pattern 405. An angle formed by the reflector 400 and the display 200 is identical to an angle formed by the reflector 400 and the virtual pattern 405. Thus, using the aforementioned method, the geometric relationships among the virtual pattern 405, the display 200, and the reflector 400 may be estimated.

Referring to FIG. 7 again, in operation 1230, projection errors between the first pattern and the virtual patterns are reduced (or alternatively, minimized). A process of projecting a feature point and a process of calculating a projection error of the feature point will be described with reference to FIG. 10A. A normalized normal vector $n_{mi}$ of the display 200 may be expressed by Equation 13.

$$n_{mi} = \frac{\bar{n} + n_i}{\|\bar{n} + n_i\|} \quad \text{[Equation 13]}$$

In Equation 13, $\bar{n}$ denotes a normal vector of the display 200, and $n_i$ denotes a normal vector of the virtual pattern 405. As shown in FIG. 6, when the feature point $\overline{X}_j$ of the display 200 is translated by $d_{ij}$ in a normal direction $n_{mi}$ of the reflector 400, the feature point $\overline{X}_j$ is projected at a position of $X_{ij}$. $d_{ij}$ may be expressed by Equation 14.

$$d_{ij} = \|\overline{X}_j - X_{ij}\| \quad \text{[Equation 14]}$$

Further, projection of the aforementioned feature point may be expressed by Equation 15.

$$T_{ij}(\overline{X}_J) = \overline{X}_J + d_{ij} n_{mi} \quad \text{[Equation 15]}$$

The projection error indicates a Euclidian distance between $t_{ij}(\overline{X}_j)$ to which the feature point $\overline{X}_j$ of the set display 200 is projected and a feature point $X_{ij}$ of a corresponding i-th virtual pattern. An average Em of the error occurring when the feature point $\overline{X}_j$ is projected to all virtual patterns may be expressed by Equation 16.

$$E_m = \frac{1}{MN} \sum_{i=1}^{N} \sum_{j=1}^{M} \|X_{ij} - T_{ij}(\overline{X}_j)\| \quad \text{[Equation 16]}$$

When a value of Em that is obtained by changing the initial value of the first transformation parameter to a desired (or alternatively, predetermined) value is less than Em obtained by the initial value, the first transformation parameter may be updated to the changed value. By iterating such a process until the value of the first transformation parameter does not change, a final value of the first transformation parameter may be obtained.

Figure 10B:
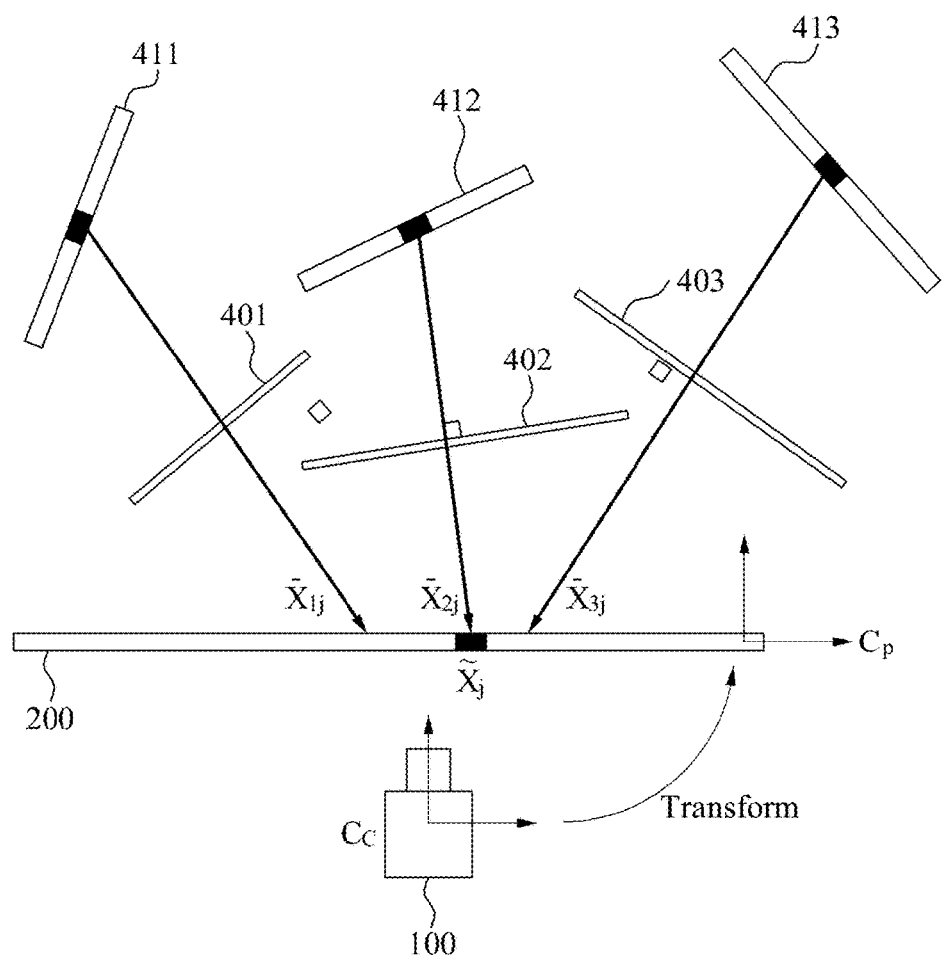
FIG. 10B illustrates a process of estimating a first transformation parameter through virtual planes according to at least one example embodiment.

FIG. 10B illustrates a process of estimating a first transformation parameter through virtual planes according to at least one example embodiment. In FIG. 10B, a first transformation parameter that reduces (or alternatively, minimizes) errors between $\tilde{X}_j$ and $\overline{X_{1,j}}$, $\overline{X_{2,j}}$, and $\overline{X_{3,j}}$ obtained based on the display 200, reflectors 401, 402, and 403, and virtual planes 411, 412, and 413 may be determined to be the final first transformation parameter.

Figure 11:
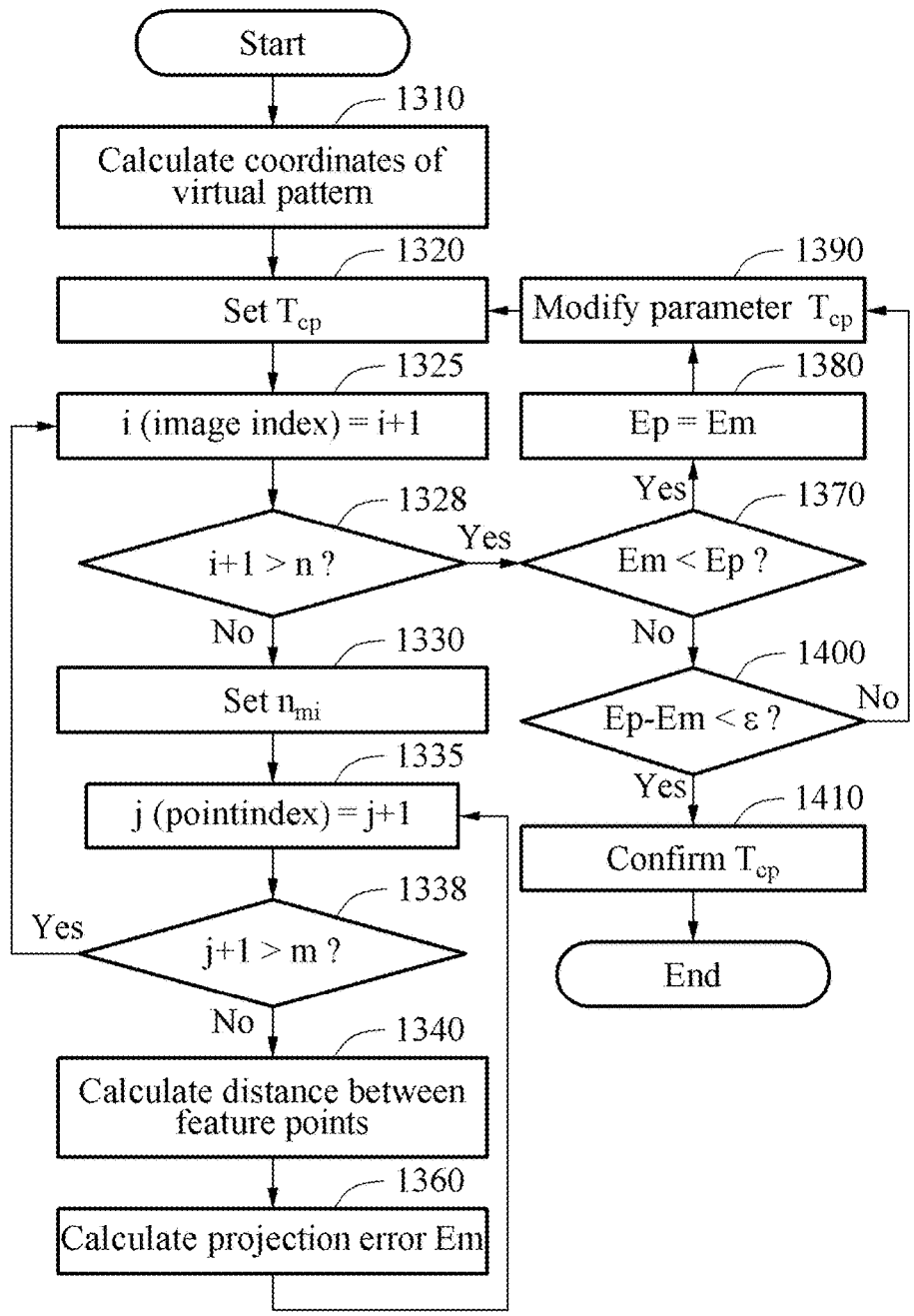
FIG. 11 illustrates a process of estimating a first transformation parameter according to at least one example embodiment.

FIG. 11 illustrates a process of estimating a first transformation parameter according to at least one example embodiment. As shown in FIG. 11, a method according to at least one example embodiment may include one or more of operations 1310-1410. The operations in FIG. 11 may be carried out and/or caused by processor 2810 from FIG. 22.

Referring to FIG. 11, in operation 1310, coordinates of a virtual pattern are calculated based on a rotation R and a translation t of the virtual pattern. The rotation R and the translation t of the virtual pattern may be obtained from an extrinsic parameter of camera. In operation 1320, a first transformation parameter Tcp is set. In an initial iteration, the first transformation parameter Tcp may be set to be an initial Tcp and an index i, indicating an image of a virtual pattern, is set to an initial value (e.g., a value of 1). As iterations are performed, the first transformation parameter Tcp may be set to a modified first transformation parameter Tcp.

In operation 1325, the index i, indicating an image of a virtual pattern, is incremented (i=i+1).

In operation 1328, it is determined whether i+1 is greater than a number n. If so, the method proceeds to operation 1370 (described below). If not, the method proceeds to operation 1330. The number n may be a number of virtual patterns on which operations 1330-1360 are performed.

In operation 1330, a normal vector $n_{mi}$ corresponding to each virtual pattern is set using the index i indicating an image of a virtual pattern.

In operation 1335, an index j, indicating a feature point in each virtual pattern, is incremented (j=j+1, where j has an initial value of, for example, 1).

In operation 1338, it is determined whether j+1 is greater than a number m. If so, the method returns to operation 1325 to increment i and search for a next virtual pattern. If not, the method proceeds to operation 1340. The number m may be a number of feature points on which operation 1340 and 1360.

In operation 1340, a distance between feature points is calculated using the index j indicating a feature point in each virtual pattern. For example, a distance between a feature point displayed on a display and a feature point in a virtual pattern may be calculated. In operation 1360, a projection error Em is calculated. For example, the projection error Em may be calculated based on a cumulative sum of distances between feature points calculated with respect to the virtual patterns. The method may return to operation 1335 to increment j and search for another feature point in the virtual pattern.

When the projection error Em is calculated for all virtual patterns (i.e., when i+1>n occurs), whether the projection error Em is less than a previous projection error Ep is verified in operation 1370. The previous projection error Ep is a projection error calculated in a previous iteration, and may be set to be a sufficiently great value in an initial iteration.

When the projection error Em is less than the previous projection error Ep, the previous projection error Ep is updated in operation 1380, and the first transformation parameter Tcp is modified in operation 1390 and the method returns to operation 1320 (where i is reset to an initial value, e.g., 1). When the projection error Em is greater than or equal to the previous projection error Ep, whether a difference between the previous projection error Ep and the projection error Em is less than a threshold ε is verified in operation 1400. The threshold ε may be a design parameter set based on empirical evidence.

When the difference between the previous projection error Ep and the projection error Em is greater than or equal to the threshold ε, the first transformation parameter Tcp may be modified in operation 1390. Conversely, when the difference between the previous projection error Ep and the projection error Em is less than the threshold ε, the first transformation parameter Tcp is confirmed in operation 1410. The confirmed first transformation parameter Tcp may be the first transformation parameter Tcp modified in the previous iteration.

Referring to FIG. 2B again, in operation 1050, a second transformation parameter may be calculated based on the captured images. A process of calculating a second transformation parameter will be described in detail with reference to FIGS. 12 through 17. In operation 1053, the first transformation parameter Tcp is used to transform the camera coordinate system Cc into the display coordinate system Cp. In operation 1055, a 3D image may be rendered based on the transformed coordinate system, the second transformation parameter Pb and the camera parameter Pc. For example, the transformed coordinate system may be used to track eyes of the user while the second transformation parameter Pb and the camera parameter Pc may be applied to rendering a 3D image by the 3D system of FIG. 1 so that a quality of the 3D image is enhanced.

Figure 12:
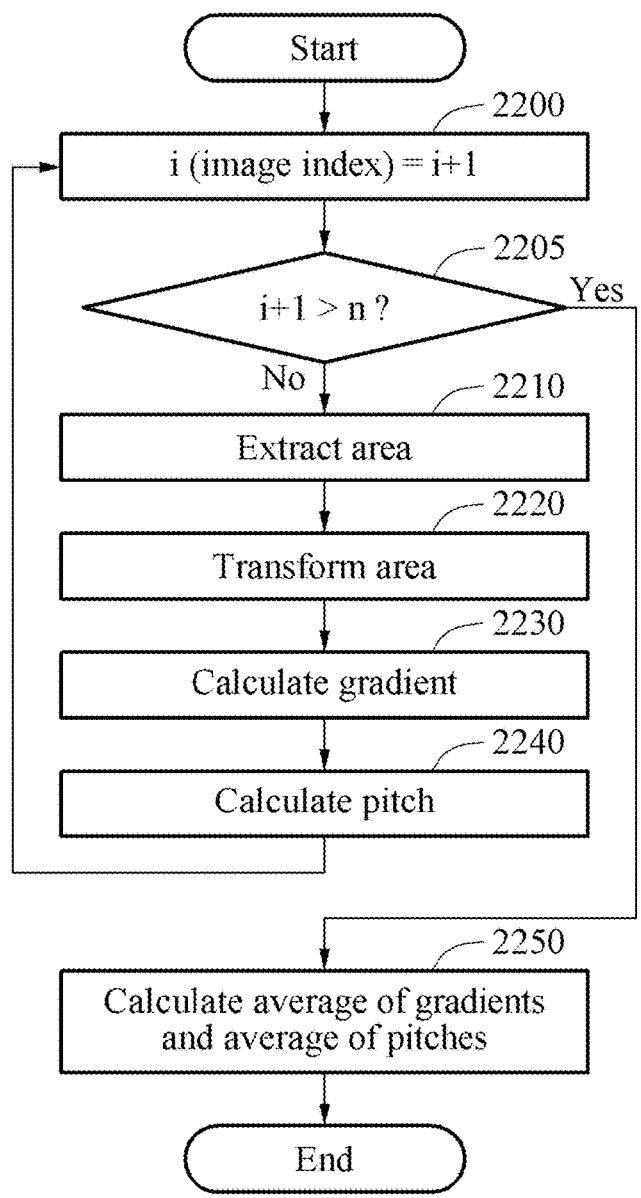
FIG. 12 illustrates a process of estimating a second transformation parameter according to at least one example embodiment.

FIG. 12 illustrates a process of estimating a second transformation parameter according to at least one example embodiment. As shown in FIG. 12, a method according to at least one example embodiment may include one or more of operations 2200-2250. The operations in FIG. 12 may be carried out and/or caused by processor 2810 from FIG. 22.

Referring to FIG. 12, in operation 2200, an index i, indicating a virtual pattern, is incremented by 1 (e.g., from an initial value of 1).

In operation 2205, it is determined whether i+1 is greater than a number n. The number n may be a number of virtual patterns on which operations 2210-2240 are performed.

In operation 2210, an area corresponding to a second pattern is extracted from each virtual pattern using the index i indicating a virtual pattern. The second pattern displayed on a display may be areas of an identical color and an identical brightness, for example, a white background. In an example, in a case in which a slanted barrier is used as an optical layer, an image photographed through a mirror when the white background is displayed on a monitor includes a pattern corresponding to the slanted barrier. Referring to a pattern 210-5 and the pattern 211-1 of FIG. 4, the pattern 210-5 may be used to estimate the camera parameter and the first transformation parameter, and the pattern 211-1 may be used to estimate the second transformation parameter.

In another example, when a slanted lens is used as the optical layer, a direct observation of the lens may be impossible. Thus, a pattern in which continuous lines of an identical brightness are disposed at desired (or alternatively, predetermined) intervals, for example, a single-colored stripe pattern, may be used as a second pattern displayed on the display. Referring to a pattern 210-6 and the pattern 211-2 of FIG. 4, the pattern 210-6 may be used to estimate the camera parameter and the first transformation parameter, and the pattern 211-2 may be used to estimate the second transformation parameter.

Figure 13:
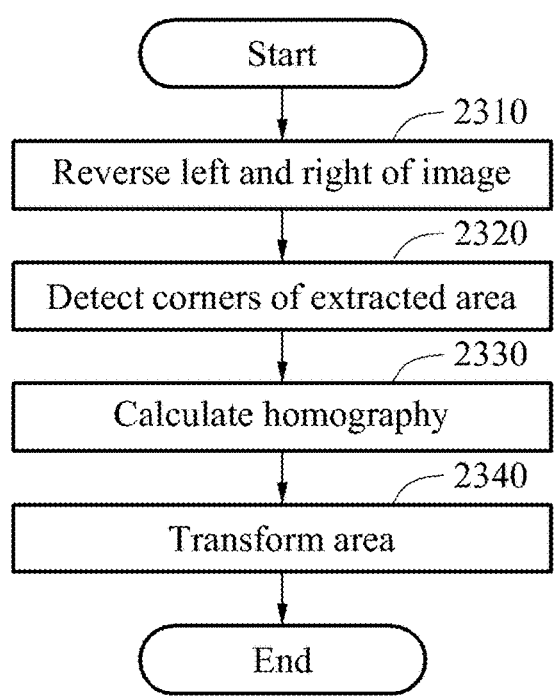
FIG. 13 illustrates a process of transforming an extracted area according to at least one example embodiment.

In operation 2220, the extracted area is transformed. The area extracted to estimate the second transformed parameter is a projected area and thus, has a size and shape differing from the original size and shape. Accordingly, a process of transforming the extracted area to have the original size and shape is required. FIG. 13 illustrates a process of transforming an extracted area according to at least one example embodiment. As shown in FIG. 13, a method according to at least one example embodiment may include one or more of operations 2310-2340. The operations in FIG. 13 may be carried out and/or caused by processor 2810 from FIG. 22.

Referring to FIG. 13, since a captured image is an image reflected through a mirror, left and right of the captured image is reversed in operation 2310. In operation 2320, an area corresponding to a second pattern is extracted from the left-and-right reversed image, and corners of the extracted area are detected. Corner points of the extracted area may be defined as p1, p2, p3, and p4. Here, p1 may correspond to an upper left corner, p2 may correspond to an upper right corner, p3 may correspond to a lower left corner, and p4 may correspond to a lower right corner.

The corner points may have a relationship as expressed by Equation 17.

$$\begin{bmatrix} 0 & w & 0 & w \\ 0 & 0 & h & h \\ 1 & 1 & 1 & 1 \end{bmatrix} = H \begin{bmatrix} p_{1x} & p_{2x} & p_{3x} & p_{4x} \\ p_{1y} & p_{2y} & p_{3y} & p_{4y} \\ 1 & 1 & 1 & 1 \end{bmatrix} \quad \text{[Equation 17]}$$

In Equation 17, w denotes an actual width length of a second pattern, and h denotes an actual height length of the second pattern. $p_{nx}$ denotes an coordinate x of $p_n$, and $p_{ny}$ denotes a coordinate y of $p_n$. H[ ] denotes a homographic operator.

In operation 2330, a homograph H satisfying Equation 17 is calculated. In operation 2340, the area is transformed by applying H to all pixels $p_i$ belonging to the extracted area S. The area transformation may be referred to as area warping. The warped pixel $p_i'$ may be expressed by Equation 18.

$$p'_i(i \in S) = H p_i(i \in S) \quad \text{[Equation 18]}$$

Referring to FIG. 12 again, in operation 2230, a gradient of a pattern included in the transformed area is calculated. In operation 2240, a pitch of the pattern included in the transformed area is calculated. In a case in which the slanted barrier is used as the optical layer and the white background is used as the second pattern, the gradient and the pitch may be deduced directly from the transformed image. For example, a portion indicated in white in the transformed image may correspond to a slit of the optical layer. Thus, by measuring a gradient of a pattern indicated in white, an angle at which the optical layer is slanted may be obtained.

When a distance between slits is defined as ph (pixel), a pitch p of the optical layer may be calculated as expressed by Equation 19.

$$p = s_p P_h \cos \theta \quad \text{[Equation 19]}$$

In Equation 19, $s_p$ denotes a size of a pixel.

When a contrast of the transformed image is relatively low, or when a lot of noise is included in the transformed image, it is difficult to extract the second transformation parameter directly from the transformed image. In this example, the transformed image may be transformed to a frequency domain, and the second transformation parameter may be extracted using Equations 20 and 21.

$$\theta = \frac{\pi}{2} - \delta. \quad \text{[Equation 20]}$$

In Equation 20, δ denotes an angle between a vertical line and a line connecting points with highest intensities in a frequency domain image, and θ denotes an angle at which an optical layer is slanted.

$$p = \frac{s_p w}{\rho} \cos\theta \quad \text{[Equation 21]}$$

In Equation 21, ρ denotes a horizontal distance between points having highest intensities in a frequency domain image, and p denotes a pitch of an optical layer. After operation 2240, the method returns to operation 2200 to increment i and search for another virtual pattern on which to perform operations 2210-2240.

When gradients and pitches in all virtual patterns are calculated (i.e., when i+1>n occurs), an average of the gradients and an average of the pitches are calculated in operation 2250.

Hereinafter, an operation of calculating a second transformation parameter in a case in which a slanted lens is used as an optical layer and a second pattern includes a stripe pattern will be described with reference to FIGS. 14 through 17.

Figure 14:
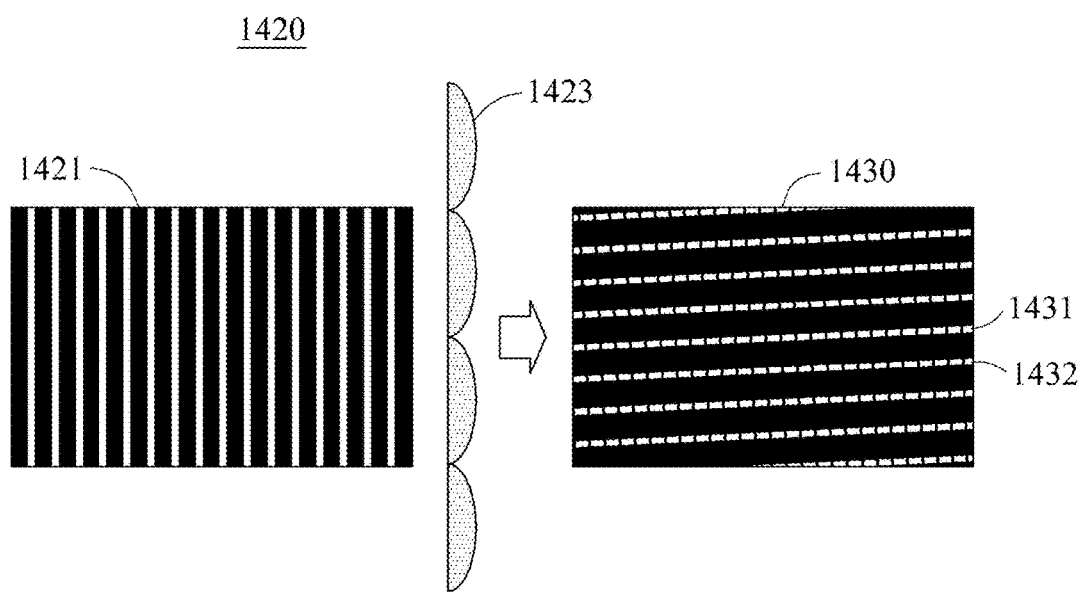
FIG. 14 illustrates a process of outputting a second pattern according to at least one example embodiment.

FIG. 14 illustrates a process of outputting a second pattern according to at least one example embodiment.

Referring to FIG. 14, an image 1421 of a second pattern may correspond to a stripe pattern. The image 1421 of the second pattern may pass through an optical layer 1423 and be displayed as an image 1430 of a third pattern. The image 1430 of the third pattern may be a ray image passing through a central point of the optical layer 1423, for example, a central axis of a lens, or a slit. The image 1430 of the third pattern may include a pattern in which lines including a plurality of points are disposed at desired (or alternatively, predetermined) intervals. For example, the image 1430 of the third pattern may include repetitive lines having a single principal direction.

A slope of each line included in the image 1430 of the third pattern may differ from a slope of each line included in the image 1421 of the second pattern. For example, lines included in the image 1421 of the second pattern may be vertical lines, and lines included in the image 1430 of the third pattern may be inclined lines. Further, an interval between the lines included in the image 1430 of the third pattern may differ from an interval between the lines included in the image 1421 of the second pattern.

As will be described in detail below, a processor may determine the second transformation parameter for a 3D display device 1420 by analyzing two adjacent lines 1431 and 1432 from among the lines included in the image 1430 of the third pattern. For example, the processor may determine the second transformation parameter based on an interval between the line 1431 and the line 1432, and slopes of the line 1431 and the line 1432. As described above, the second transformation parameter may include a pose and a pitch of the optical layer 1423.

Figure 15A:
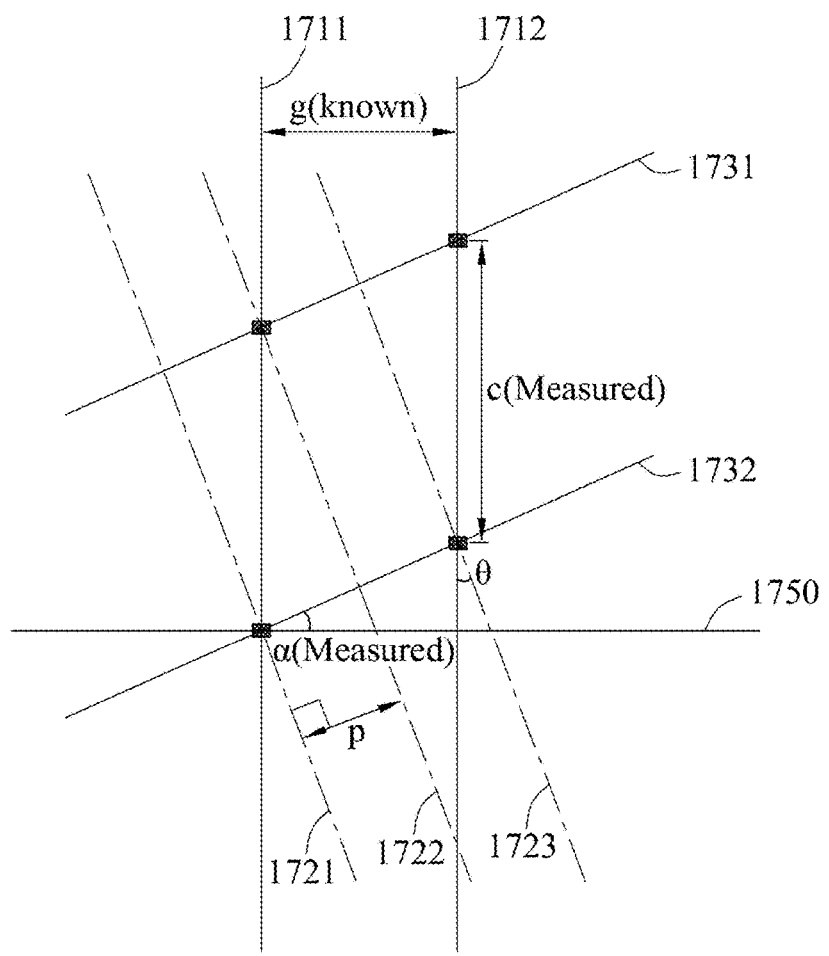
FIGS. 15A through 15C illustrate a geometric relationship between an image of a third pattern and a second transformation parameter according to at least one example embodiment.
Figure 15B:
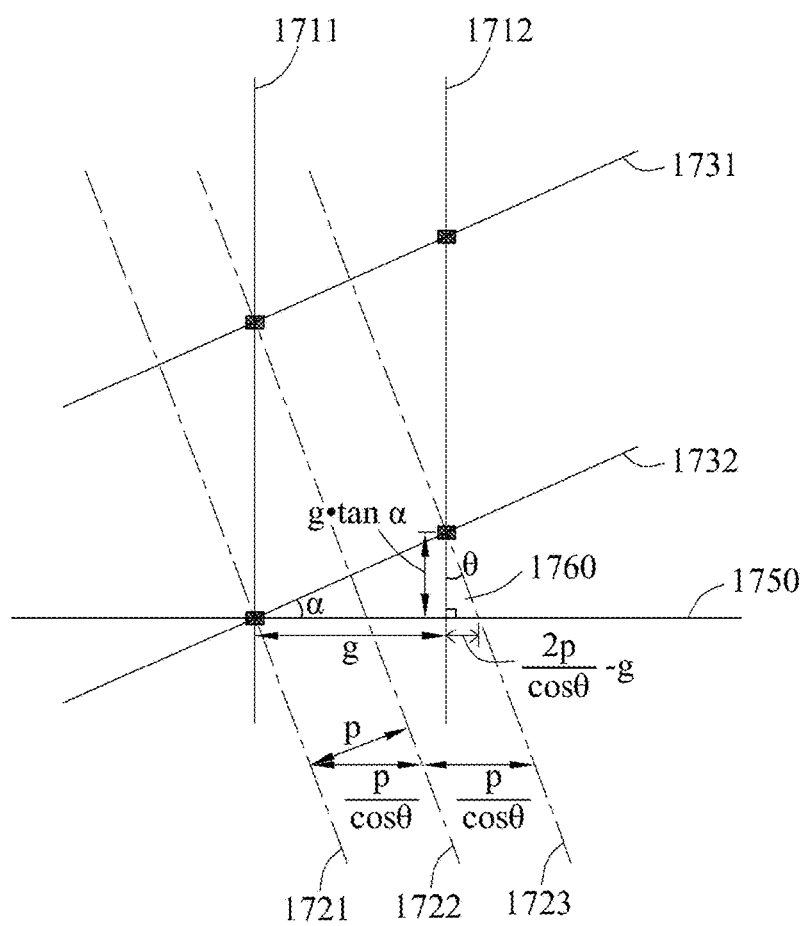
Figure 15C:
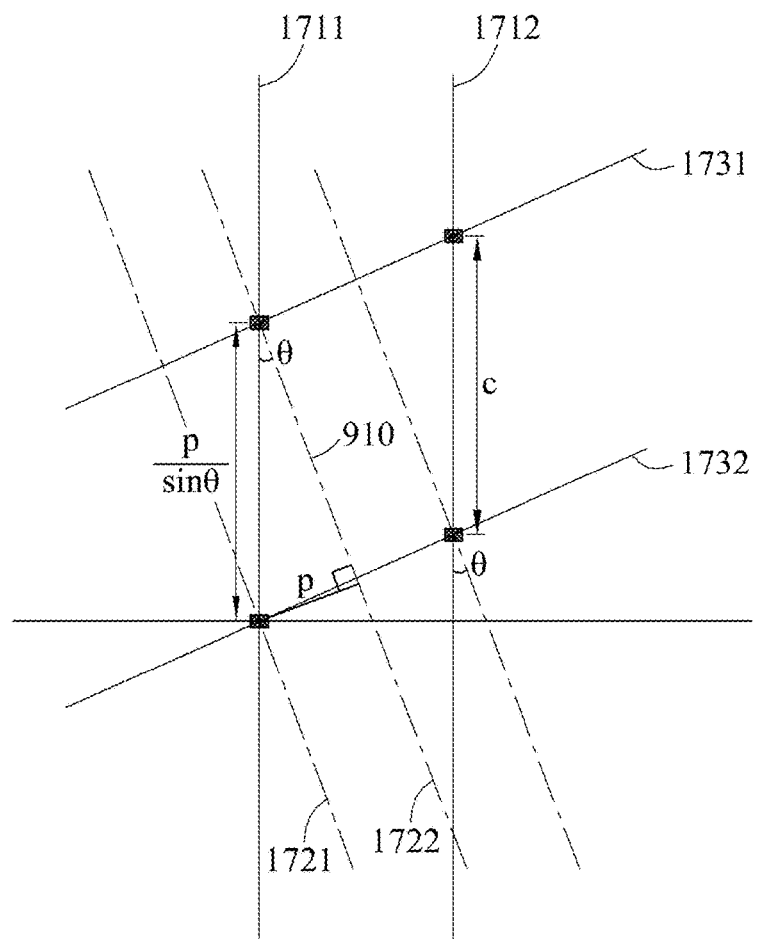
Figure 16:
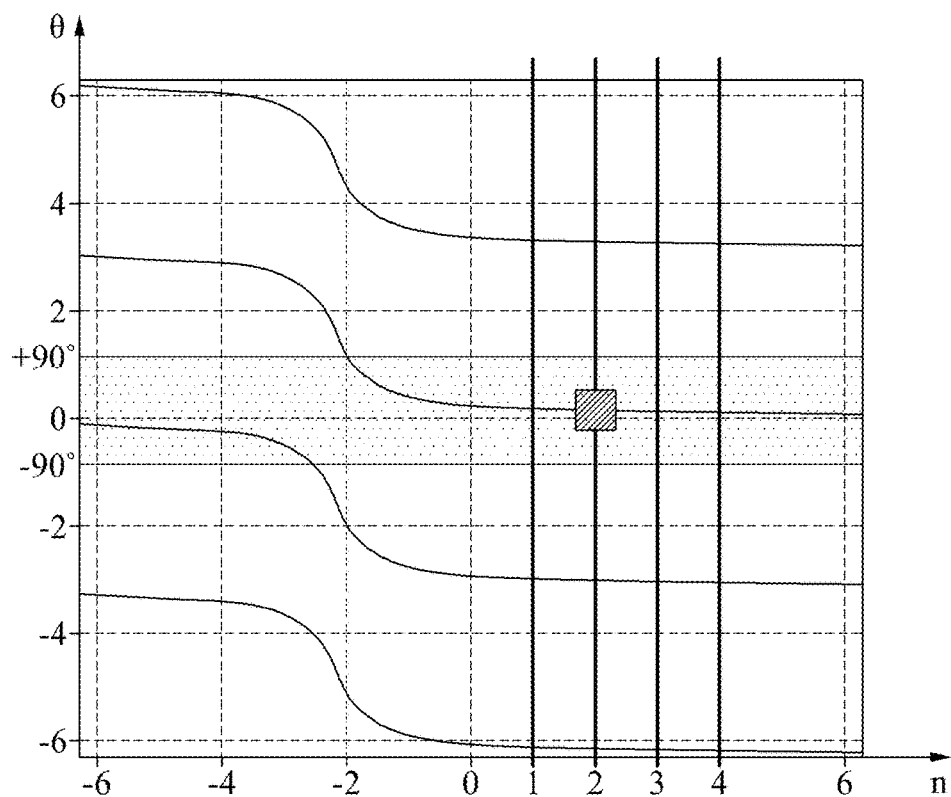
FIG. 16 illustrates a relationship between a number of elements on an optical layer corresponding to a single period of a second pattern and a rotation angle of the optical layer according to at least one example embodiment.

FIGS. 15A through 15C illustrate a geometric relationship between an image of a third pattern and a second transformation parameter according to at least one example embodiment.

Referring to FIG. 15A, an image of a third pattern may include a plurality of points constituting lines 1731 and 1732. A processor may measure a coefficient α corresponding to a gradient of the third pattern from the image of the third pattern. For example, the coefficient α corresponding to the gradient of the third pattern may correspond to a slope of the line 1732. Further, the processor (e.g., processor 2810 in FIG. 22) may measure a coefficient c corresponding to a period of the third pattern from the image of the third pattern. For example, the coefficient c corresponding to the period of the third pattern may correspond to a vertical interval between the lines 1731 and 1732.

A line 1711 and a line 1712 are lines included in an image of a second pattern. The line 1711 and the line 1712 are perpendicular to a line 1750. The processor may be aware of information on a panel of a 3D display device in advance. For example, the processor may be aware of a subpixel structure of the panel, a resolution of the panel, and a size of the panel. The subpixel structure of the panel may include an interval between subpixels of a color used for the second pattern in the panel. The processor may obtain a coefficient g corresponding to a period of the second pattern based on the information on the panel. For example, the coefficient g corresponding to the period of the second pattern may be an interval between the lines 1711 and 1712.

The image of the second pattern may be displayed on the panel, and the image of the third pattern may be captured from a desired (or alternatively, predetermined) point of view. Thus, an actual interval between lines displayed on the panel may differ from the interval between the lines 1711 and 1712 virtually shown on the image of the third pattern. The processor may obtain the interval between the lines 1711 and 1712 based on a ratio of the size of the panel to a size of the image of the third pattern.

The processor may determine a second transformation parameter for the 3D display device based on the second pattern and the third pattern. For example, the processor may determine the second transformation parameter based on the coefficient α corresponding to the gradient of the third pattern, the coefficient c corresponding to the period of the third pattern, and the coefficient g corresponding to the period of the second pattern. The second transformation parameter may include a coefficient p associated with a dimension of the optical layer and a coefficient θ associated with a pose of the optical layer.

The coefficient p associated with the dimension of the optical layer may be a pitch of the optical layer. The pitch of the optical layer may be an interval between elements included in the optical layer. For example, the pitch of the optical layer may be a shortest interval between a central axis 1721 of a first lens and a central axis 1722 of a second lens. The coefficient θ associated with the pose of the optical layer may be a rotation angle of the optical layer. The rotation angle of the optical layer may be an angle at which the optical layer rotates with respect to the panel. For example, the rotation angle of the optical layer may be an angle between a central axis 1723 of a third lens and the line 1712 displayed on the panel.

Referring to FIG. 15B, a horizontal interval between the central axis 1721 of the first lens and the central axis 1722 of the second lens may be p/cos θ. p/cos θ may be a horizontal pitch of the optical layer. The horizontal interval between the central axis 1721 of the first lens and the central axis 1722 of the second lens may be equal to a horizontal interval between the central axis 1722 of the second lens and the central axis 1723 of the third lens. Thus, a horizontal interval between the central axis 1721 of the first lens and the central axis 1723 of the third lens may be 2·p/cos θ.

Referring to a right triangle 1760, a length of a bottom side may be 2·p/cos θ−g, a height may be g·tan α, and an acute angle may be θ at the intersection of central axis 1723, line 1712, and line 1732. Based on lengths of two sides and the acute angle of the right triangle 1760, Equation 22 may be deduced.

$$\tan\theta = \frac{\frac{np}{\cos\theta} - g}{g \tan\alpha}$$ [Equation 22]

Equation 22 may be arranged as expressed by Equation 23.

$$g \tan\alpha \sin\theta + g \cos\theta - np = 0$$ [Equation 23]

In Equation 23, g denotes a coefficient corresponding to a period of a second pattern, and a denotes a coefficient corresponding to a gradient of a third pattern. θ denotes a rotation angle between an optical layer and a panel, and p denotes a pitch of the optical layer. n denotes a number of elements of the optical layer corresponding to a single period of the second pattern. For example, n may correspond to a number of lenses provided between adjacent lines included in an image of the third pattern.

Referring to FIG. 15C, a vertical interval between the central axis 1721 of the first lens and the central axis 1722 of the second lens may be p/sin θ. Referring to a right triangle 910, a length of a bottom side may be p, and one acute angle may be θ. Based on lengths of two sides and one acute angle of the right triangle 910, Equation 24 may be deduced.

$$c = \frac{p}{\sin\theta}$$ [Equation 24]

In Equation 24, c denotes a coefficient corresponding to a period of the third pattern, p denotes the pitch of the optical layer, and θ denotes the rotation angle between the optical layer and the panel. The processor may determine the pitch p of the optical layer and the rotation angle θ between the optical layer and the panel based on Equations 23 and 24.

For ease of description, FIGS. 15A through 15C are described assuming a case in which n corresponds to "2." However, the pitch p of the optical layer and the rotation angle θ between the optical layer and the panel may vary depending on n. In an example, in a situation in which a second pattern and a third pattern are given, a pitch p of an optical layer and a rotation angle θ between the optical layer and a panel satisfying Equations 23 and 24 in a case of n being "1" may be calculated. In another example, in a situation in which a second pattern and a third pattern are given, a pitch p of an optical layer and a rotation angle θ between the optical layer and a panel satisfying Equations 23 and 24 in a case of n being "3" may be calculated.

In Equations 23 and 24, there are a total of three unknowns n, p, and θ. Since a number of the unknowns is greater than a number of equations, a plurality of solutions satisfying Equations 23 and 24 may exist. For example, a relationship between the number n of the elements of the optical layer corresponding to the single period of the second pattern and the rotation angle θ of the optical layer may be represented as shown in a graph of FIG. 16.

The number n of the elements of the optical layer corresponding to the single period of the second pattern may be a positive integer greater than or equal to "1", and the rotation angle θ of the optical layer may be greater than or equal to −90 degrees and less than or equal to +90 degrees. Thus, candidate solutions may be extracted from the graph of FIG. 16. For example, when n is "1", "2", "3", or "4", θ may be 23.2735 degrees, 11.9920 degrees, 8.0214 degrees, or 6.0218 degrees, respectively. When θ is known, p may be calculated based on Equation 24.

When an initial parameter of a 3D display device is known, an optimal solution may be selected from candidate solutions based on the initial parameter. The initial parameter may be a design value for the 3D display device. For example, when an optical layer of the 3D display device is designed to have a pitch of 0.5 millimeters (mm), a candidate solution of n=2 having a pitch p most approximate to the design value of 0.5 mm may be finally selected from the candidate solutions. When the optical layer of the 3D display device is designed to have a rotation angle of 12 degrees, a candidate solution of n=2 having a rotation angle θ most approximate to the design value of 12 degrees may be finally selected from the candidate solutions. At least one example embodiment may provide technology that determines a rotation angle of an optical layer and a pitch of the optical layer simultaneously.

Figure 17:
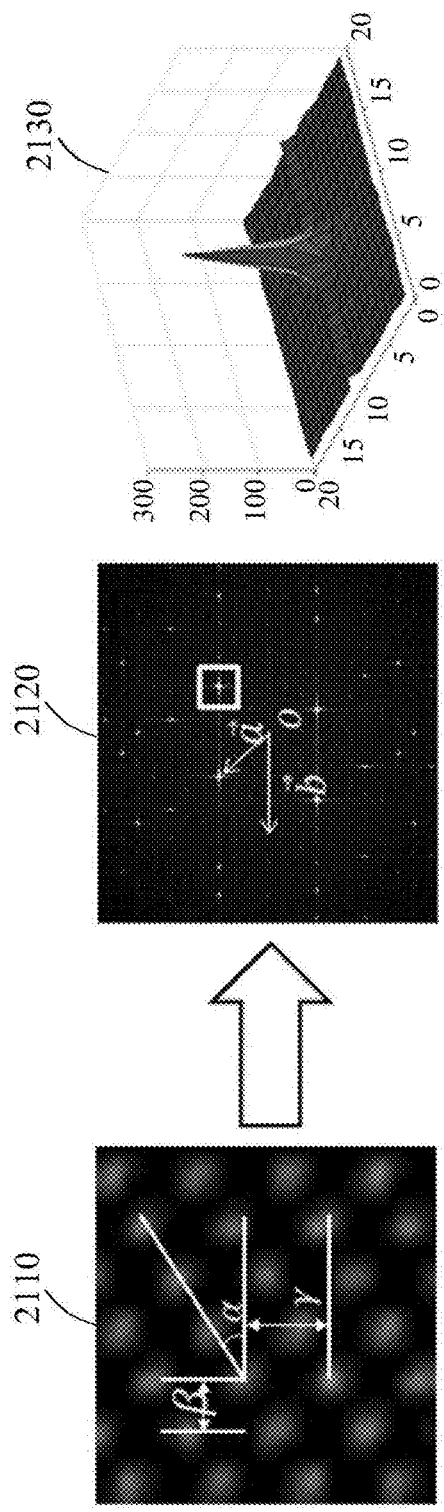
FIG. 17 illustrates a scheme of measuring a coefficient corresponding to a gradient of a third pattern and a coefficient corresponding to a period of the third pattern by performing a Fourier transform on an image of the third pattern according to at least one example embodiment.

FIG. 17 illustrates a scheme of measuring a coefficient corresponding to a gradient of a third pattern and a coefficient corresponding to a period of the third pattern by performing a Fourier transform on an image of the third pattern according to at least one example embodiment. At least one example embodiment may provide technology that measures coefficients resistant against noise, irrespective of a gradient of a captured image.

A pattern included in an image of a third pattern may include noise, or may be irregular. Thus, an error may occur when measuring a gradient of the third pattern and/or an interval of the third pattern directly from the image of the third pattern. At least one example embodiment may provide technology that accurately measures a coefficient corresponding to the gradient of the third pattern and a coefficient corresponding to the period of the third pattern in a frequency domain by performing a Fourier transform on the image of the third pattern.

Referring to FIG. 17, an image 2120 may be a result of performing a Fourier transform on an image 2110 of a third pattern. Unlike the image 2110 of the third pattern, a gradient and a period of a pattern may be explicitly represented in the image 2120. Although noise is included in the image 2110 of the third pattern, the identical gradient and the identical period may be represented in the image 2120.

A processor (e.g., processor 2810 in FIG. 22) may measure a coefficient corresponding to the gradient of the third pattern and a coefficient corresponding to the period of the third pattern using the image 2120. A vector b may be a line connecting points horizontally close to a center of the image 2120. The vector b may represent a vertical frequency component in the image of the third pattern, and indicate that the image of the third pattern is inclined. The processor may calibrate remaining gradients based on the vector b. A vector a may be a line connecting points having highest intensities in the image 2120. A slope of the vector a may be perpendicular to the gradient of the third pattern. An image 2130 illustrates an intensity of a partial area in the image 2120. An axis x and an axis y of the image 2130 corresponds to an axis x and an axis y of the image 2120, and a value of an axis z of the image 2130 may be represented as a brightness in the image 2120.

The processor may measure the coefficient corresponding to the gradient of the third pattern using Equation 25.

$$\alpha = b - \frac{\pi}{2} - a \quad \text{[Equation 25]}$$

In Equation 25, α denotes the coefficient corresponding to the gradient of the third pattern, b denotes an angle between an axis x of the image 2120 and the vector a, and a denotes an angle between the axis x of the image 2120 and the vector b.

The processor may calculate a number of lines having an identical slope or an identical principal direction in the image of the third pattern by dividing the overall height of the image 2120 by a height. Here the height may be a difference in height between points having highest intensities in the image 2120, or a height of a point closest to the origin of the image 2120, among the points having the highest intensities in the image 2120.

The processor may calculate the coefficient corresponding to the period of the third pattern by dividing a height of an image of a second pattern displayed on the 3D display device by the calculated number. In this example, the processor may calculate a coefficient corresponding to a period of the second pattern to be an actual interval between lines of the second pattern displayed on a panel.

The processor may calculate the coefficient corresponding to the period of the third pattern by dividing a height of a captured image of a third pattern. In this example, the processor may calculate the coefficient corresponding to the period of the second pattern by adjusting an actual interval between the lines of the second pattern displayed on the panel based on a ratio of a size of the panel to a size of the image of the third pattern.

The processor may determine the second transformation parameter for the 3D display device more accurately by iteratively performing the foregoing processes. For example, the processor may determine a final second transformation parameter using statistics of second transformation parameters deduced as a result of the iteratively performing. In another example, the processor may determine the final second transformation parameter by excluding a second transformation parameter out of a standard distribution from the second transformation parameters. The processor may determine the final second transformation parameter based on the second transformation parameters deduced as a result of the iteratively performing, thereby reducing (or alternatively, minimizing) a level of the final transformation parameter being inaccurate due to an error that may be included in a result of a single iteration.

Figure 18:
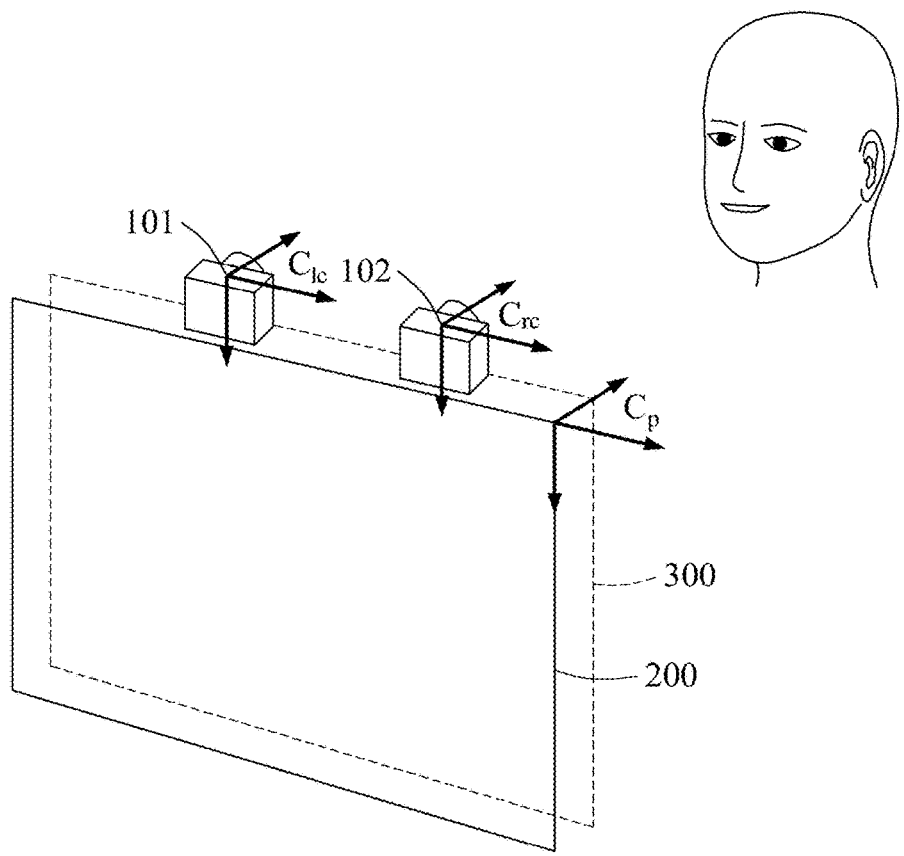
FIGS. 18 and 19 illustrate a process of estimating parameters in a case in which a plurality of cameras is provided according to at least one example embodiment.
Figure 19:
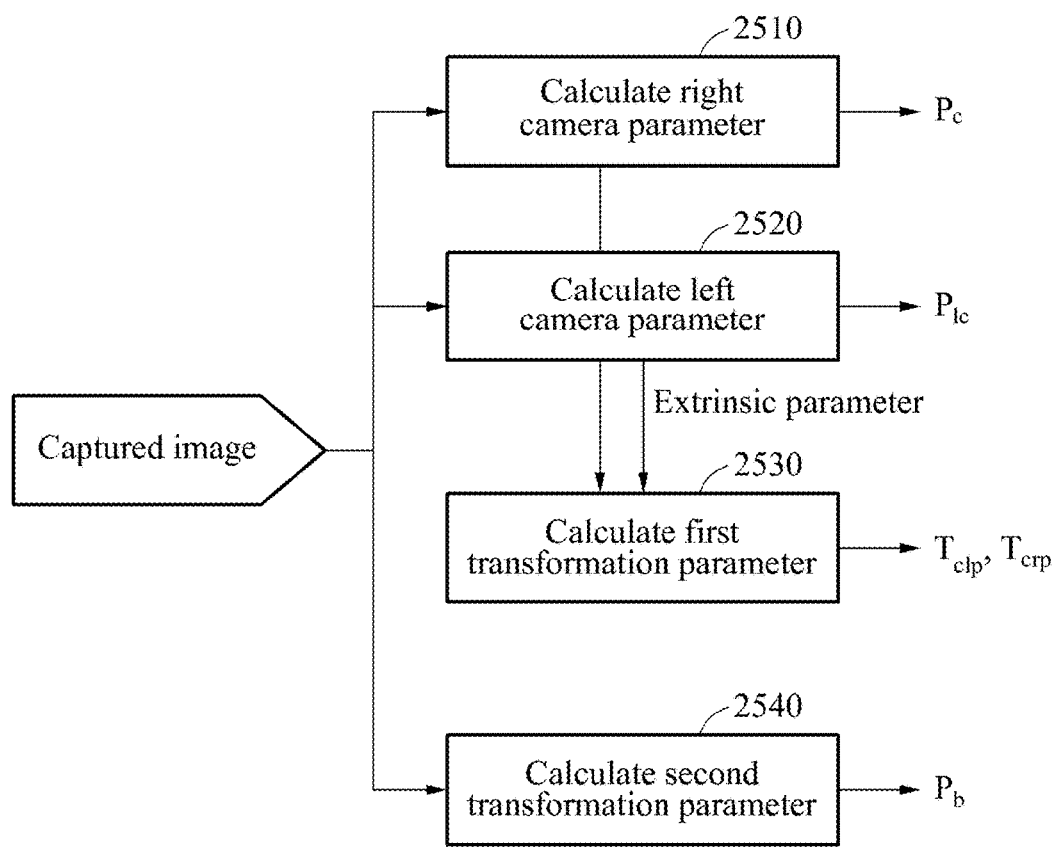

FIGS. 18 and 19 illustrate a process of estimating parameters in a case in which a plurality of cameras is provided according to at least one example embodiment. As shown in FIG. 19, a method according to at least one example embodiment may include one or more of operations 2510-2540. The operations in FIGS. 18 and 19 may be carried out and/or caused by processor 2810 from FIG. 22.

Referring to FIG. 18, a display 200 with which a left camera 101 and a right camera 102 are combined, and a 3D transform device 300 of the display 200 are illustrated. The cameras 101 and 102 have a camera coordinate axis Clc and a camera coordinate axis Crc, respectively. The display 200 has a display coordinate axis Cp. Referring to FIG. 19, in operation 2510, a right camera parameter is calculated based on a captured image. In operation 2520, a left camera parameter is calculated based on a captured image. In operation 2530, a first transformation parameter is calculated based on an extrinsic parameter. The extrinsic parameter may include a first extrinsic parameter calculated with respect to the left camera 101, and a second extrinsic parameter calculated with respect to the right camera 102. The first transformation parameter with respect to the first extrinsic parameter and a second transformation parameter with respect to the second extrinsic parameter may be calculated separately and in accordance with the operations described above. In operation 2540, the second transformation parameter is calculated based on the captured image. Although an example in which two cameras are provided is described, parameters may be estimated using the similar method in a case in which at least three cameras are provided.

Figure 20:
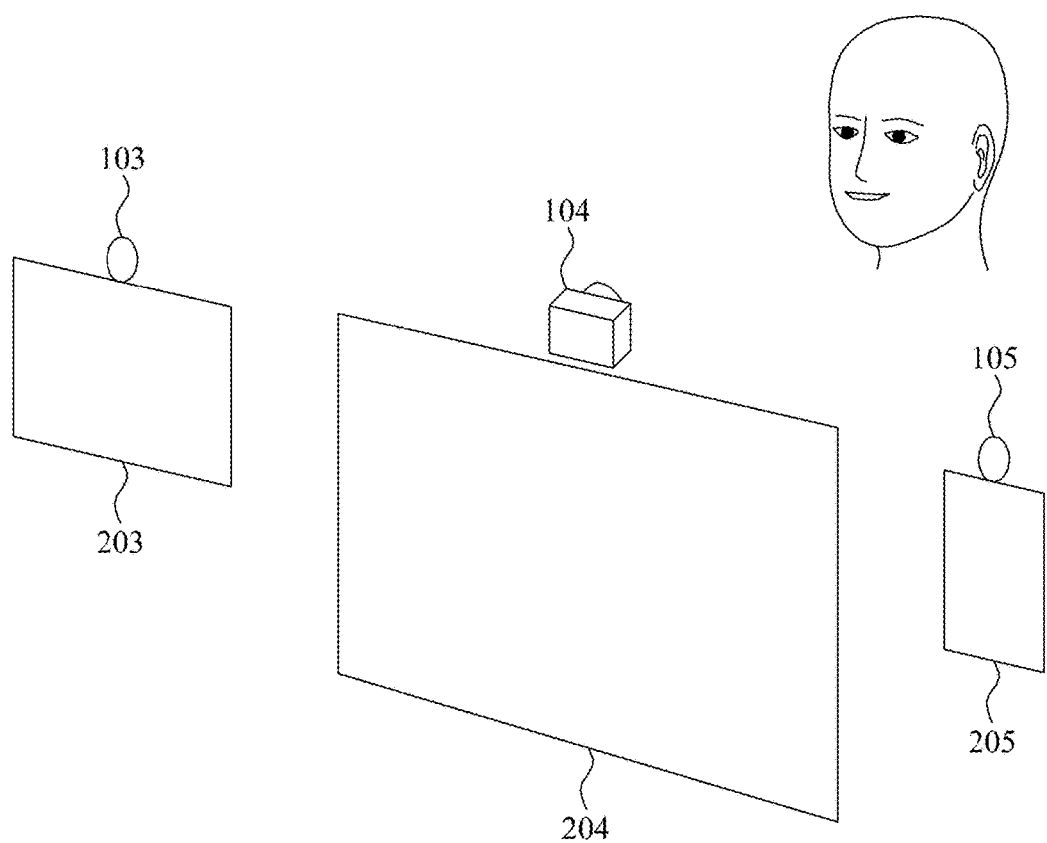
FIGS. 20 and 21 illustrate a process of estimating parameters of a display device including a camera according to at least one example embodiment.
Figure 21:
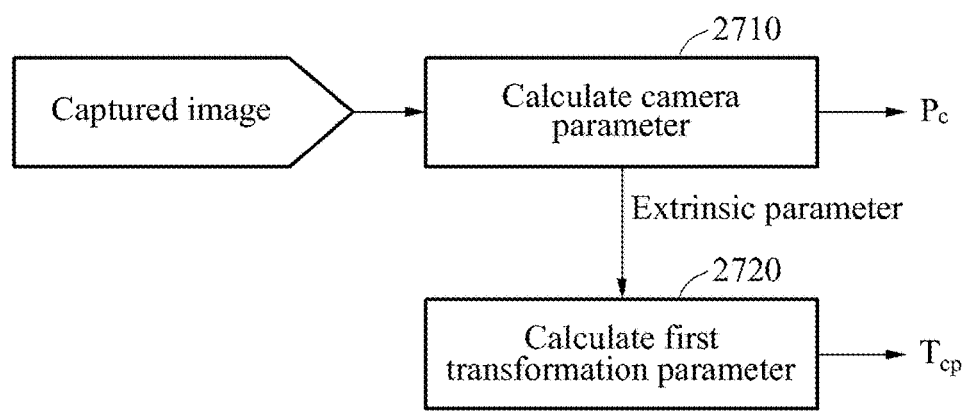

FIGS. 20 and 21 illustrate a process of estimating parameters of a display device including a camera according to at least one example embodiment. As shown in FIG. 21, a method according to at least one example embodiment may include one or more of operations 2710 and 2720. The operations in FIGS. 20 and 21 may be carried out and/or caused by processor 2810 from FIG. 22.

Referring to FIG. 20, a camera 103 and a display 203 of a tablet computer, a camera 104 and a display 204 of a TV or a monitor, and a camera 105 and a display 205 of a mobile phone are illustrated. Referring to FIG. 21, in operation 2710, a camera parameter is calculated based on a captured image. In operation 2720, a first transformation parameter is calculated based on an extrinsic parameter. Each electronic device may estimate poses of the camera and the display thereof through the first transformation parameter. The aforementioned description may be applicable to an electronic device with which a display and a camera are combined, in addition to the tablet computer, the TV, the monitor, and the mobile phone.

Figure 22:
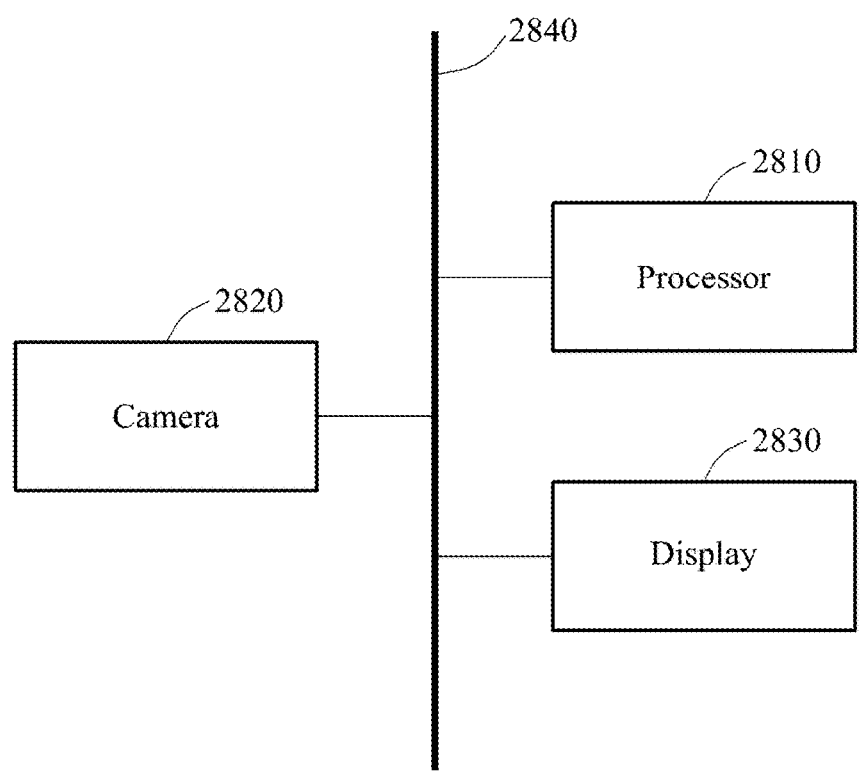
FIG. 22 illustrates an electronic system according to at least one example embodiment.

FIG. 22 illustrates an electronic system according to at least one example embodiment.

Referring to FIG. 22, an electronic system includes a processor 2810, a camera 2820, and a display 2830. The processor 2810, the camera 2820, and the display 2830 may communicate through a bus 2840.

The camera 2820 may capture an image using a well-known method, for example, a method of transforming an optical image into an electronic signal. The captured image is output to the processor 2810. The processor 2810 may include at least one device described with reference to FIGS. 1 through 23, or may perform at least one method described with reference to FIGS. 1 through 23. For example, the processor 2810 may perform the operations described with reference to FIG. 2. The display 2830 may display a first image including a first pattern and a second pattern.

Although not shown in the drawings, the electronic system may further include a memory (e.g., as part of the processor 2810 or as a separate element). The memory may store images captured by the camera 2820, and/or a parameter calculated by the processor 2810. The memory may be a volatile memory or a non-volatile memory.

The processor 2810 may be a special purpose processor that executes a program (or computer readable instructions), and controls the electronic system. A program code (or computer readable instructions) executed by the processor 2810 may be stored in the memory. The electronic system may be connected to an external device, for example, a personal computer or a network, through an input/output device (not shown), and exchange data with the external device.

Although FIG. 22 illustrates the processor 2810, the camera 2820 and the display 2830 as being part of a single system, it should be understood that each element may exist as a separate device. For example, the processor 2810 (including a memory) may exist as a device implemented by a dongle with data interfaces (e.g., universal serial bus (USB) interface, high definition multimedia interface (HDMI), etc.) for sending and receiving data to/from the camera 2820 and the display 2830.

The electronic system may include various electronic systems, for example, mobile devices such as a mobile phone, a smart phone, a personal digital assistant (PDA), a tablet computer, and a laptop computer, computing devices such as a personal computer, a tablet computer, and a netbook computer, and electronic products such as a television, a smart television, and a security device for gate control.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor (i.e., a special purpose processor), a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of estimating a parameter of a display device, the method comprising:
    displaying, on a display, a first image comprising a first pattern;
    capturing second images generated when the first image is reflected by a reflector at different angles, using a camera combined with the display; and
    estimating a first transformation parameter between the camera and the display based on the first image and the second images; and
    estimating a second transformation parameter between the display and an optical layer associated with the display based on a second pattern included in the first image and the at least one of the second images.

2. The method of claim 1, wherein the first transformation parameter comprises at least one of a rotation matrix for performing a transformation between coordinates of the camera and coordinates of the display, and a translation vector for performing a transformation between coordinates of the camera and coordinates of the display.

3. The method of claim 1, wherein the estimating comprises determining the first transformation parameter as a transformation parameter that minimizes projection errors between the first pattern and virtual patterns corresponding to the second images.

4. The method of claim 3, wherein each of the virtual patterns is a virtual image generated when the first pattern is focused at a corresponding one of the different angles in the reflector.

5. The method of claim 1, wherein the estimating comprises:
    estimating geometric relationships between the display and the reflector based on the second images;

calculating projection errors between the first pattern and virtual patterns corresponding to the second images based on the geometric relationships; and updating the first transformation parameter to reduce the projection errors.

6. The method of claim 1, wherein the first pattern comprises a pattern in which a shape is repeated.

7. The method of claim 1, further comprising:
estimating an intrinsic parameter of the camera based on the first pattern and at least one of the second images.

8. The method of claim 1, wherein the estimating the second transformation parameter comprises estimating the second transformation parameter based on a period of the second pattern, a period of a third pattern included in the at least one of the second images, and a gradient of the third pattern.

9. The method of claim 8, further comprising at least one of:
obtaining the period of the second pattern based on a subpixel structure of the display; and
obtaining the period of the third pattern and the gradient of the third pattern in a Fourier space in which the third pattern is frequency-transformed.

10. The method of claim 7, wherein the intrinsic parameter comprises at least one of a focal length of the camera, a center position of the camera, and a skewness of the camera.

11. The method of claim 1, wherein the second transformation parameter comprises at least one of a pitch of the optical layer and a rotation angle between the optical layer and the display.

12. The method of claim 1, wherein the second pattern comprises at least one of:
a pattern in which continuous lines of an identical brightness are arranged at intervals; and
a pattern comprising areas with an identical color and an identical brightness.

13. The method of claim 1, wherein the second pattern is included in a shape repeated in the first pattern.

14. A non-transitory computer readable medium including computer readable instructions to cause a computer to perform the method of claim 1.

15. A three-dimensional (3D) display device comprising:
a camera configured to perform eye tracking for a user;
a display configured to display a 3D image; and
a processor configured to,
control the display to display a first image comprising a first pattern,
control the camera to capture second images, the second images being generated when the first image is reflected by a reflector at different angles,
estimate a first transformation parameter between the camera and the display based on the first image and the second images,
estimate a second transformation parameter between the display and an optical layer associated with the display based on a second pattern included in the first image and at least one second image of the second images,
track eyes of the user based on the first transformation parameter, and
render the 3D image based on the tracked eyes.

16. The device of claim 15, wherein the first transformation parameter comprises at least one of a rotation matrix for performing a transformation between coordinates of the camera and coordinates of the display, and a translation vector for performing a transformation between coordinates of the camera and coordinates of the display.

17. The device of claim 15, wherein the processor is configured to determine the first transformation parameter as a transformation parameter that minimizes projection errors between the first pattern and virtual patterns corresponding to the second images.

18. The device of claim 15, wherein the processor is configured to estimate geometric relationships between the display and the reflector based on the second images, calculate projection errors between the first pattern and virtual patterns corresponding to the second images based on the geometric relationships, and update the first transformation parameter to reduce the projection errors.

19. The device of claim 15, wherein the processor is configured to render the 3D image based on the second transformation parameter.

20. The device of claim 15, wherein the second transformation parameter comprises at least one of a pitch of the optical layer and a rotation angle between the optical layer and the display.

21. The device of claim 15, wherein the processor is configured to estimate the second transformation parameter based on a period of the second pattern, a period of a third pattern included in the at least one second image, and a gradient of the third pattern.

22. The device of claim 15, wherein the processor is configured to estimate an intrinsic parameter of the camera based on the first pattern and at least one of the second images, and track the eyes of the user based on the intrinsic parameter and the first transformation parameter.

23. The device of claim 22, wherein the intrinsic parameter comprises at least one of a focal length of the camera, a center position of the camera, and a skewness of the camera.

24. The device of claim 15, wherein the first pattern comprises a pattern in which a shape is repeated.

25. The device of claim 15, wherein the second pattern comprises at least one of:
a pattern in which continuous lines of an identical brightness are arranged at intervals; and
a pattern comprising areas with an identical color and an identical brightness.

26. The device of claim 25, wherein the second pattern is included in a shape repeated in the first pattern.

27. A method of estimating a parameter of a display device, the method comprising:
displaying, on a display, a first image comprising a first pattern and a second pattern;
capturing, a second image generated when the first image is reflected in a reflector, using a camera combined with the display;
estimating a parameter of the camera based on an area corresponding to the first pattern in the second image;
estimating a first transformation parameter between the camera and the display based on the area corresponding to the first pattern in the second image; and
estimating a second transformation parameter between the display and an optical layer combined with the display based on an area corresponding to the second pattern in the second image.

28. The method of claim 27, wherein the parameter of the camera comprises at least one of a focal length of the camera, a center position of the camera, and a skewness of the camera.

29. The method of claim 27, wherein the first transformation parameter comprises at least one of a rotation matrix for performing a transformation between coordinates of the camera and coordinates of the display, and a translation vector for performing a transformation between coordinates of the camera and coordinates of the display.

30. The method of claim 27, wherein the second transformation parameter comprises at least one of a pitch of the optical layer and a rotation angle between the optical layer and the display.

31. The method of claim 27, wherein the display device comprises a device configured to play a three-dimensional (3D) image by tracking positions of eyes of a user.

32. The method of claim 27, wherein the first pattern comprises a pattern in which a shape is repeated.

33. The method of claim 27, wherein the second pattern comprises at least one of:
a pattern in which continuous lines of an identical brightness are arranged at intervals; and
a pattern comprising areas with an identical color and an identical brightness.

34. The method of claim 33, wherein the second pattern is included in a shape repeated in the first pattern.

35. A display device comprising:
a display configured to display a first image comprising a first pattern and a second pattern;
a camera combined with the display to capture a second image generated when the first image is reflected in a reflector; and
a processor configured to,
estimate a parameter of the camera based on an area corresponding to the first pattern in the second image,
estimate a first transformation parameter between the camera and the display based on the area corresponding to the first pattern in the second image, and
estimate a second transformation parameter between the display and an optical layer combined with the display based on an area corresponding to the second pattern in the second image.

36. A device comprising:
a processor; and
a memory including computer readable instructions, which when executed by the processor, cause the processor to,
receive a first image displayed by a display, the first image including a first pattern,
receive second images, the second images being reflected versions of the first image that are captured at different angles, using a camera, and
estimate a first transformation parameter between the camera and the display based on the first image and the second images, and
estimate a second transformation parameter between the display and an optical layer associated with the display based on a second pattern included in the first image and the at least one of the second images.

37. The device of claim 36, wherein the first transformation parameter includes at least one of a rotation matrix and a translation vector, and the memory includes computer readable instructions to cause the processor to,
transform a coordinate system of the camera into a coordinate system of the display based on at least one of the rotation matrix and the translation vector, and
render a three-dimensional image using the transformed coordinate system.

38. The device of claim 36, wherein the processor is configured to estimate by determining the first transformation parameter as a transformation parameter that minimizes projection errors between the first pattern and virtual patterns corresponding to the second images.

39. The device of claim 38, wherein each of the virtual patterns is a virtual image generated when the first pattern is focused at a corresponding one of the different angles.

40. The device of claim 36, wherein the processor is configured to estimate by,
estimating geometric relationships between the display and a reflector based on the second images, the reflector being used to generate the second images,
calculating projection errors between the first pattern and virtual patterns corresponding to the second images based on the geometric relationships, and
updating the first transformation parameter to reduce the projection errors.

41. The device of claim 36, wherein the memory includes computer readable instructions to cause the processor to estimate an intrinsic parameter of the camera based on the first pattern and at least one of the second images.

42. The device of claim 36, wherein the at least one of the second images includes a third pattern, and the processor is configured to estimate the second transformation parameter based on a period of the second pattern, a period of the third pattern, and a gradient of the third pattern.

43. The device of claim 36, wherein the second transformation parameter includes at least one of a pitch of the optical layer and a rotation angle between the optical layer and the display, and the memory includes computer readable instructions to cause the processor to render a three-dimensional image based on at least one of the pitch and the rotation angle.

44. A method comprising:
receiving a first image displayed by a display, the first image including a first pattern;
receiving second images, the second images being reflected versions of the first image that are captured at different angles, using a camera;
estimating a first transformation parameter between the camera and the display based on the first image and the second images;
estimating a second transformation parameter between the display and an optical layer associated with the display based on a second pattern included in the first image and the at least one of the second images; and
rendering a three-dimensional image based on the first transformation parameter.

* * * * *